(12) United States Patent
Kim et al.

(10) Patent No.: US 12,341,394 B2
(45) Date of Patent: Jun. 24, 2025

(54) MOTOR ASSEMBLY

(71) Applicant: LG ELECTRONICS INC., Seoul (KR)

(72) Inventors: Sunghyun Kim, Seoul (KR); Seonghun Seo, Seoul (KR); Honghyun Kim, Seoul (KR); Hwajung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 284 days.

(21) Appl. No.: 17/942,467

(22) Filed: Sep. 12, 2022

(65) Prior Publication Data

US 2023/0094078 A1   Mar. 30, 2023

(30) Foreign Application Priority Data

Sep. 28, 2021   (KR) .................. 10-2021-0127621

(51) Int. Cl.
*H02K 3/52*    (2006.01)
*H02K 7/08*    (2006.01)
*H02K 9/06*    (2006.01)

(52) U.S. Cl.
CPC ............. *H02K 3/522* (2013.01); *H02K 7/085* (2013.01); *H02K 9/06* (2013.01); *H02K 2203/03* (2013.01); *H02K 2203/12* (2013.01)

(58) Field of Classification Search
CPC .......... H02K 9/06; H02K 3/522; H02K 7/085; H02K 2203/12; H02K 2203/03
(Continued)

(56) References Cited

U.S. PATENT DOCUMENTS 5,763,978 A * 6/1998 Uchida ................. H02K 3/345
                                                                 310/214
10,044,241 B2   8/2018 Nakatake et al.
(Continued)

FOREIGN PATENT DOCUMENTS

CN      107749679      3/2018
EP        0772275      5/1997
(Continued)

OTHER PUBLICATIONS

Extended European Search Report dated Feb. 22, 2023 issued in Application No. 22198090.7.
(Continued)

*Primary Examiner* — Alex W Mok
(74) *Attorney, Agent, or Firm* — KED & ASSOCIATES, LLP

(57) ABSTRACT

A motor assembly includes a stator including a stator core, a stator coil, and an insulator, and a rotor. The stator core includes a yoke, a plurality of teeth, and a shoe. The insulator includes an insulator body wrapping and insulating an outer surface of the shoe so that an inner end of the shoe is exposed to outside, and a creepage distance extension portion extending a creepage distance between the stator coil and the inner end of the shoe. The creepage distance extension portion includes an inner extension section extending from the end of the shoe along the circumferential direction, and an outer extension section extending outwardly from the inner extension section. Accordingly, the creepage distances between the stator coil and the stator core in the circumferential direction and the radial direction may be increased, respectively, without increasing the size of the stator in the radial direction.

19 Claims, 21 Drawing Sheets

(58) Field of Classification Search
USPC .......................................... 310/89, 214, 215
See application file for complete search history.

(56) References Cited

U.S. PATENT DOCUMENTS

| | | | | |
|---|---|---|---|---|
| 2019/0131828 A1* | 5/2019 | Oketani | ............... | H02K 15/022 |
| 2019/0165651 A1* | 5/2019 | Kishi | .................... | H02K 7/083 |
| 2020/0403487 A1* | 12/2020 | Tsuchida | .............. | H02K 11/215 |
| 2021/0021169 A1* | 1/2021 | Hong | ........................ | H02K 3/28 |
| 2021/0028663 A1* | 1/2021 | Hong | ........................ | H02K 3/18 |

FOREIGN PATENT DOCUMENTS

| | | |
|---|---|---|
| EP | 3767798 | 1/2021 |
| GB | 2563515 | 12/2018 |
| JP | H08-19202 | 1/1996 |
| JP | 2008-048491 | 2/2008 |
| KR | 10-2012-0082920 | 7/2012 |
| KR | 10-2015-0027714 | 3/2015 |
| KR | 10-2017-0121964 | 11/2017 |
| KR | 10-2018-0076123 | 7/2018 |
| KR | 10-2018-0101559 | 9/2018 |
| KR | 10-2021-0115847 | 9/2021 |

OTHER PUBLICATIONS

Korean Office Action dated Apr. 18, 2023 issued in Application No. 10-2021-0127621.

* cited by examiner

MOTOR ASSEMBLY

CROSS-REFERENCE TO RELATED APPLICATION(S)

Pursuant to 35 U.S.C. § 119(a), this application claims the benefit of the earlier filing date and the right of priority to Korean Patent Application No. 10-2021-0127621, filed in Korea on Sep. 28, 2021, the contents of which are incorporated by reference herein in their entirety.

BACKGROUND

1. Field

This disclosure relates to a motor assembly.

2. Background

As is well known, a motor is a device that converts electrical energy into mechanical energy. The motor may generally include a stator, and a rotor rotatably arranged with a predetermined air gap with respect to the stator. The motor may be configured to have various sizes and weights depending on an intended use.

One type of motor may include a motor assembly having an impeller to generate pressure or to promote air movement during rotation of the rotor. When reducing the sizes of the stator and the rotor to provide a smaller motor, the rotor may rotate at a relatively high speed (e.g., 100 krpm or more) in order to maintain an air volume. However, when the sizes of the stator and the rotor are reduced and the rotor is configured to rotate at a high speed, it may be difficult to secure an insulation distance between a stator coil and a stator core of the stator.

For example, a motor assembly having a reduced size and designed to operate at relatively high rotational speeds to provide desired air flow levels may be used in handheld device (e.g., a hair dryer, a vacuum cleaner, etc.) allow the handheld device to have a relatively small external size and low weight to ease user manipulation of the device. However, in such a miniature motor assembly, it may be difficult to secure the insulation distance of the stator coil due to the reduced sized of the stator.

In consideration of this problem of securing an adequate insulation distance between a stator coil and a stator core, one type of motor discussed in Japanese Published Patent Application No. JP2008-048491 may have a protrusion protruding to the inside of a slot in a radial direction in an insulator coupled to the stator core for insulation of the stator coil. However, in the motor including the protrusion in the insulator, a creepage distance between the stator coil and the stator core may increase by a length of the protrusion in a radial direction due to the formation of the protrusion, so that the increase in the creepage distance may be insufficient. For example, in the case of the miniature motor assembly in which the sizes of the stator and the rotor are reduced, there is a limitation in increasing the creepage distance due to the size of the protrusion because a radial size of the slot itself is small.

In another type of motor discussed in Korean Published Patent Application No. KR10-2015-0027714 (corresponding to U.S. Pat. No. 10,044,241), a motor may include an insulating structure in which insertion recesses are respectively configured in a region opposite to an opening of a slot of an insulator, and after winding of the stator coil is finished, insulating paper may be inserted into the insertion recesses to block the opening of the slot. However, in this type of motor in which insulating paper is inserted into the opening of the slot of the insulator, the insulating paper may be inserted into the opening of each slot after the stator coil is wound, which may take a lot of time and effort.

In another type of motor discussed in Korean Published Patent Application No. KR10-2012-0082920, a motor may include an insulating structure in which an outer surface of the stator coil is wrapped with insulating paper to be insulated after the winding of the stator coil is finished. However, in this type of motor in which the outer surface of the stator coil is wrapped with insulating paper, each stator coil is individually wrapped with insulating paper after winding the stator coil, which may take a lot of time and effort.

Meanwhile, in such a miniature motor assembly of the various types of known motors, when the insulator is configured to be coupled to the periphery of the stator core, the insulator may have a structure overlapping to be coupled in a thickness direction to secure a creepage distance, which causes a thickness of the insulator to increase such that a space factor of a conductor of the stator coil wound inside the slot is significantly reduced. When the space factor of the conductor in the slot is reduced, the performance (e.g., power) of the motor assembly may be impaired.

BRIEF DESCRIPTION OF THE DRAWINGS

The embodiments will be described in detail with reference to the following drawings in which like reference numerals refer to like elements wherein.

DETAILED DESCRIPTION

Hereinafter, implementations of the present disclosure will be described in detail with reference to the accompanying drawings. For the sake of brief description with reference to the drawings, the same or equivalent components will be provided with the same reference numbers, and description thereof will not be repeated. A singular representation used herein may include a plural representation unless it represents a definitely different meaning from the context. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

Figure 1:
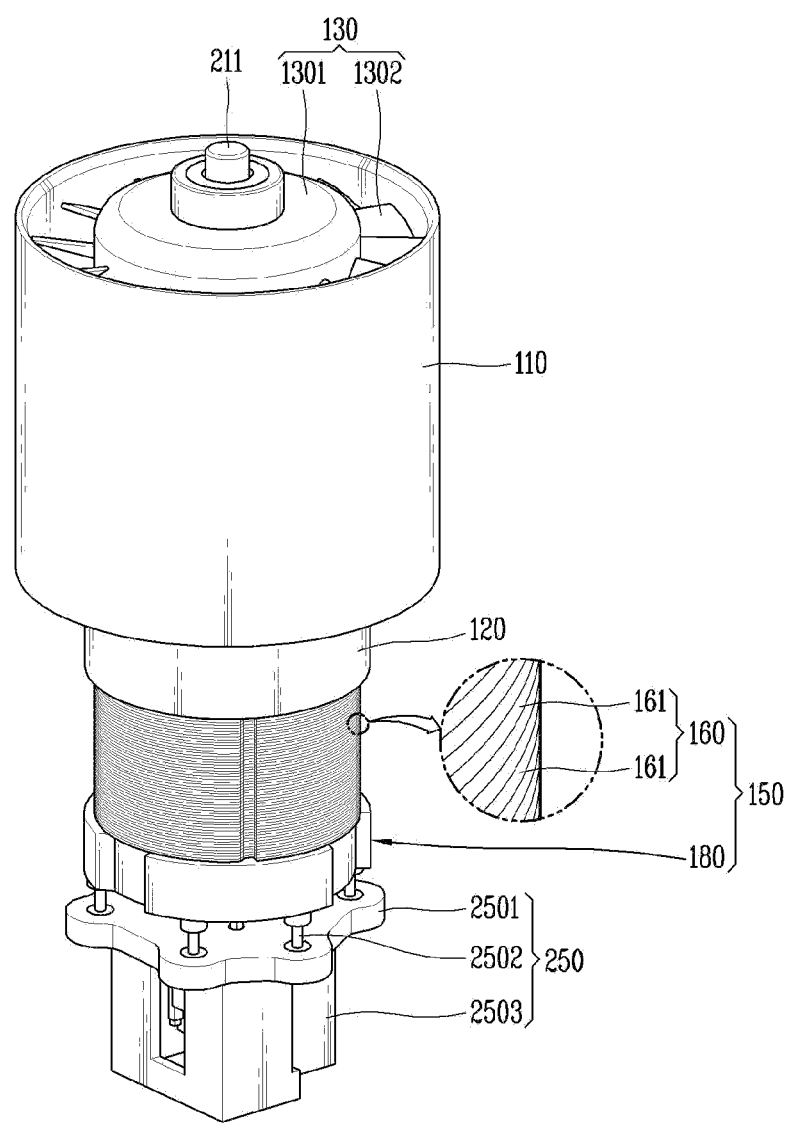
FIG. 1 is a perspective view of a motor assembly according to an embodiment of the present disclosure.
Figure 2:
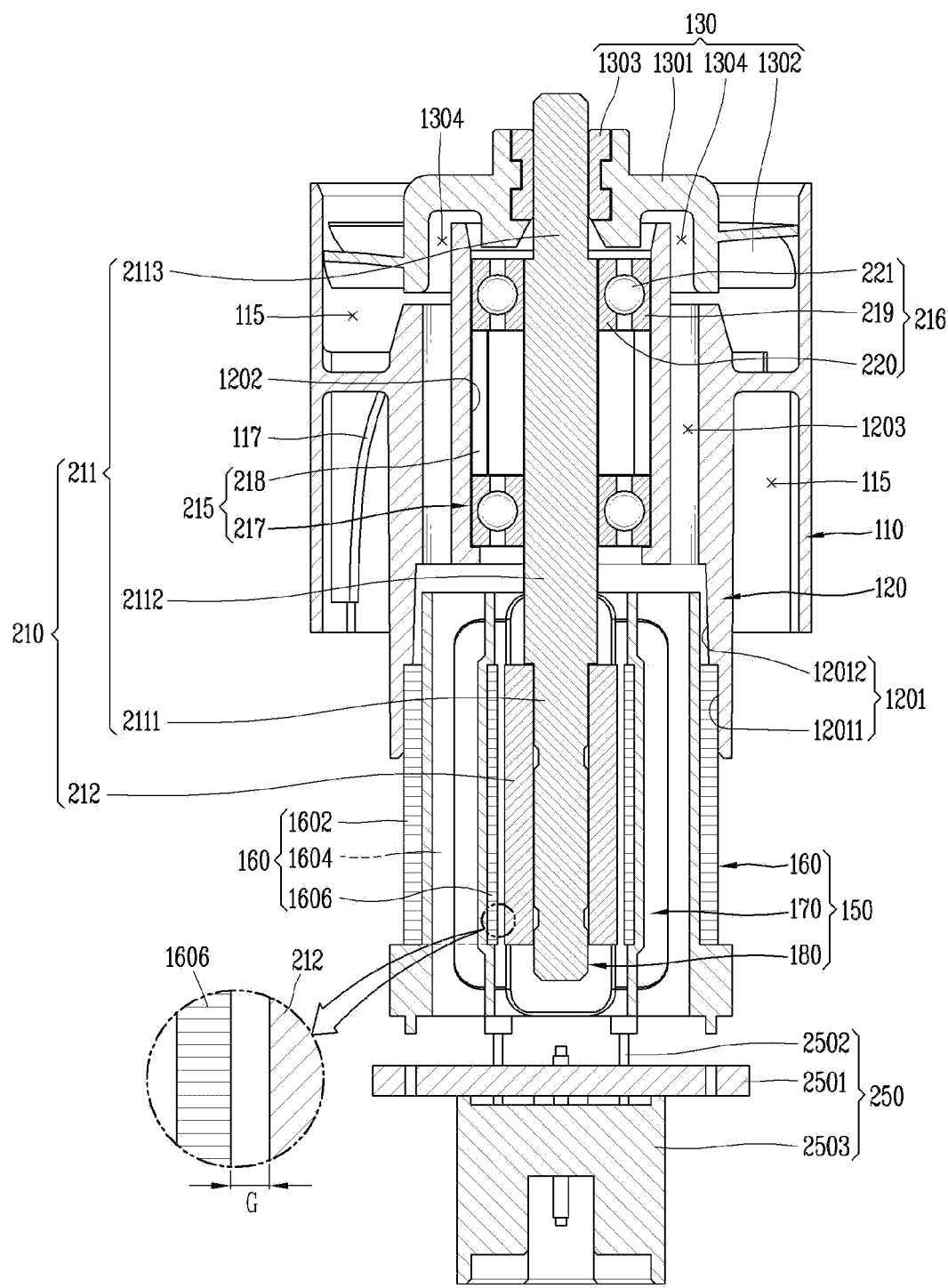
FIG. 2 is a longitudinal cross-sectional view of the motor assembly of FIG. 1.
Figure 3:
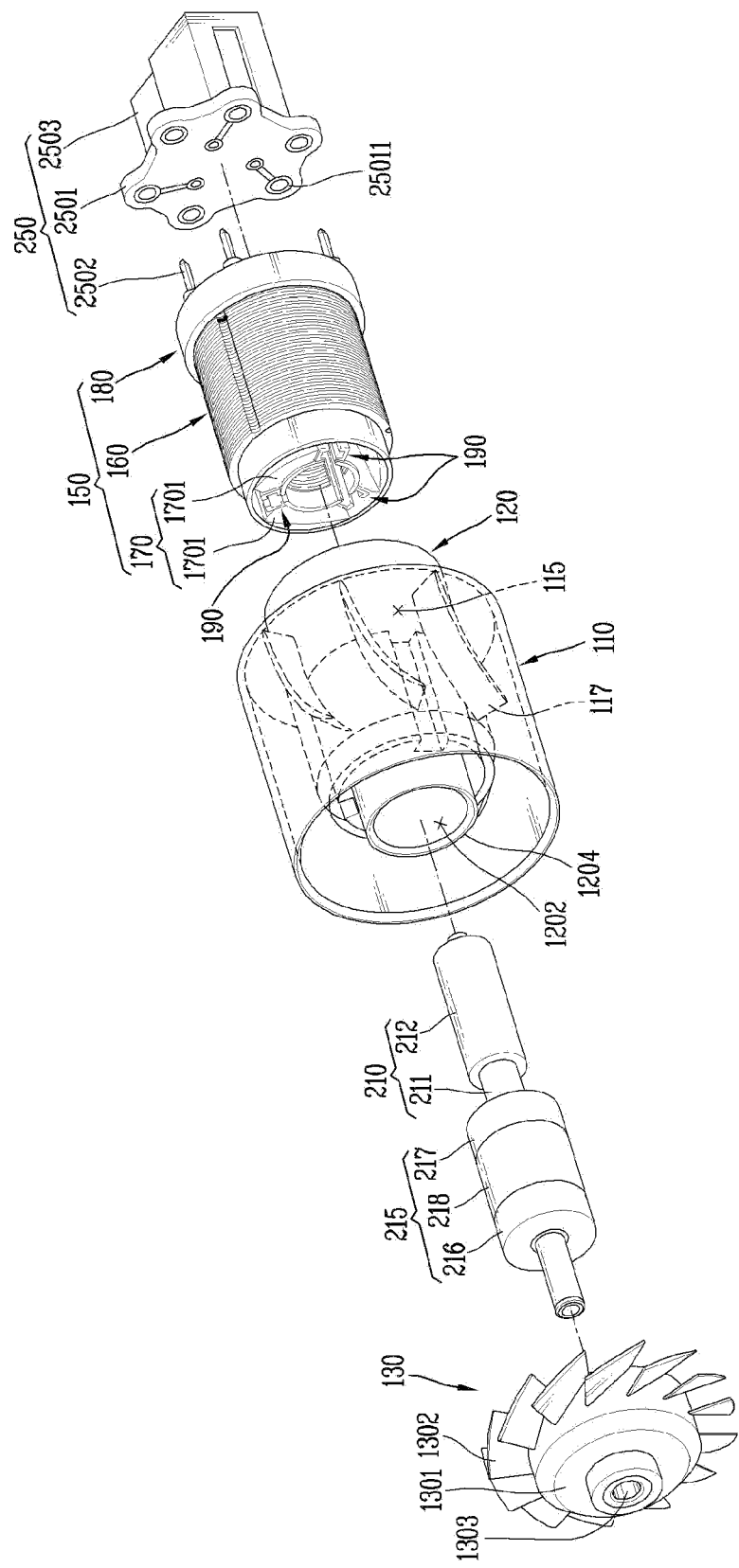
FIG. 3 is an exploded perspective view of the motor assembly of FIG. 1.

FIG. 1 is a perspective view of a motor assembly according to an embodiment of the present disclosure, FIG. 2 is a longitudinal cross-sectional view of the motor assembly of FIG. 1, and FIG. 3 is an exploded perspective view of the motor assembly of FIG. 1. As illustrated in FIGS. 1 to 3, a motor assembly of one embodiment may include a stator 150 and a rotor 210.

The stator 150 may include a stator core 160, a stator coil 170 wound around the stator core 160, and an insulator 180 insulating the stator core 160 and the stator coil 170. It should be appreciated, however, that the stator 150 may include additional, fewer, or different components A rotor accommodating hole 1607 in which the rotor 210 is rotatably accommodated may be provided inside the stator core 160 (see FIG. 4). A plurality of teeth 1604 and slots 1605 may be alternately arranged around the rotor accommodating hole 1607 (see FIG. 6).

The stator core 160 may be configured by insulating and stacking a plurality of electrical steel plates 161. In each of the plurality of electrical steel sheets 161, the rotor accommodating hole 1607 may be provided in the center, and the teeth 1604 and the slot 1605 may be alternately arranged around the rotor accommodating hole 1607.

The stator coil 170 may be configured to be connected to, for example, a three-phase AC power source. The stator coil 170 may include, for example, a plurality of phase coils 1701 connected to each phase (U-phase, V-phase, and W-phase) of the three-phase AC power source.

The insulator 180 may be provided between the stator core 160 and the stator coil 170. The insulator 180 includes an insulator body 181 provided to insulate the stator core 160 and the stator core 160 and a creepage distance extension portion (or insulator extension) 190 protruding from the insulator body 181 to extend (increase) a creepage distance between the stator core 160 and the stator coil 170 (see FIG. 4).

A printed circuit board (PCB) 250 may be provided on one side (e.g., a lower side in the drawing) of the stator 150. The stator 150 and the PCB 250 may be electrically connected. Power may be supplied to the stator 150 via the PCB 250.

The PCB 250 may include, for example, a substrate 2501 including an electric circuit and a plurality of connection pins 2502 connected to the substrate 2501. A connector 2503 is provided in the PCB 250 to be electrically connected to other electrical components (e.g., an inverter). In one embodiment, an electric component (e.g., an inverter) connected to the PCB 250 to supply power may be configured to be connected to a household (e.g., 110V or 220V) power source. In one embodiment, the creepage distance extension portion 190 may implemented to meet the creepage distance standards suitable for household 110/220V voltage safety design standards.

The substrate 2501 may include a connection pin insertion portion (or connection pin insertion recess) 25011 into which the connection pin 2502 is inserted. In one embodiment, the connection pin 2502 may be implemented as six pieces that may be connected to both ends of each phase coil 1701 of the stator coil 170.

The connection pin 2502 may include an electrical conductor. One end of the connection pin 2502 may be connected to one end (e.g., lower end in the drawing) of the stator 150, and another end may be connected to the PCB 250. The connection pin 2502 may be configured to have a length that allows the stator 150 and the PCB 250 to be spaced apart from each other by a preset distance.

The connection pin insertion portion 25011 may be implemented as six pieces. One end of each of the connection pins 2502 connected to one end of each phase coil 1701 may be connected to each phase (U phase, V phase, and W phase) of the power source, and the connection pin 2502 connected to the other end of each phase coil 1701 may be electrically connected to each other. The substrate 2501 of the PCB 250 may include a neutral wire (pattern) for simultaneously connecting (Y connection) one end of each of the three-phase coils 1701.

The rotor 210 may be rotatably accommodated in the stator 150. The rotor 210 may include, for example, a rotating shaft 211 and a permanent magnet 212 coupled to the rotating shaft 211. It should be appreciated, however, that the rotor 210 may include additional, fewer, and/or different components.

The permanent magnet 212 may be implemented in a cylindrical shape having an outer diameter of a preset size. In one example, the permanent magnet 212 may have an outer diameter of 5.8 to 6.6 mm. The stator 150 and the rotor 210 are coupled such that a preset air gap G is provided between stator 150 and the permanent magnet 212.

A rotating shaft hole may be provided in the center of the permanent magnet 212 so that the rotating shaft 211 may be inserted. The rotating shaft hole may be configured to penetrate along the axial direction.

The permanent magnet 212 may be configured so that different magnetic poles (e.g., a north (N) pole and a south (S) pole) are arranged along the circumferential direction. The rotating shaft 211 may be implemented to have a longer length than that of the permanent magnet 212.

An impeller 130 may be provided on the rotating shaft 211. The impeller 130 may be rotated about the rotating shaft 211. The impeller 130 may include, for example, a hub 1301 and a plurality of blades 1302 disposed around the hub 1301.

An outer housing 110 may be provided outside the impeller 130. The outer housing 110 may be implemented in a cylindrical shape. An inner housing 120 may be provided inside the outer housing 110. The impeller 130 and the inner housing 120 may be provided inside the outer housing 110. The impeller 130 and the inner housing 120 may be disposed to be spaced apart from each other along the axial direction.

The inner housing 120 may have an outer surface having a reduced size compared to the inner surface of the outer housing 110. The inner housing 120 and the outer housing 110 may be arranged concentrically with each other. An air flow path 115 is provided between the outer housing 110 and the inner housing 120

A plurality of vanes 117 may be provided between the inner housing 120 and the outer housing 110. The plurality of vanes 117 may be spaced apart from each other along the circumferential direction to partition the air flow path 115 into a plurality of parts. One side of the plurality of vanes 117 may be connected to the inner housing 120, and the other side may be connected to the outer housing 110.

In one embodiment, the motor assembly may be implemented as a miniature motor assembly in which, for example, the outer housing 110 may be configured to have an outer diameter of 30 mm or less and the stator 150 may be configured to have an outer diameter of 20 mm or less. Accordingly, an external size and weight of the motor assembly may be remarkably reduced. More specifically, for example, in one embodiment, the motor assembly may be implemented as a miniature motor assembly in which the outer housing 110 has an outer diameter of 28 mm, the outer diameter of the stator core 160 is 17.5 mm, and the outer diameter of the permanent magnet 212 is 6.2 mm.

As described above, the motor assembly of one embodiment implemented as a miniature motor assembly that may be provided in a handheld device used by the hand, for example, a hair dryer. Since the motor assembly may have a relatively small external size and a relatively small weight, an installation space of the motor assembly inside the hair dryer may be reduced and weight increase due to the installation of the motor assembly may be suppressed, so that the size and weight of the hair dryer may be relatively reduced. Accordingly, manufacture and use (handling) of the hair dryer may be facilitated.

The permanent magnet 212 may be, for example, coupled to one end (a lower end in the drawing) of the rotating shaft 211 along the axial direction. The impeller 130 may be provided at the other end (an upper end in the drawing) of the rotating shaft 211. The impeller 130 may, for example, be configured to suck air along the axial direction and discharge the sucked air along the axial direction.

In one embodiment, the stator 150 and the rotor 210 may be configured to enable high-speed rotation (e.g., 120 to 185 KRPM). Accordingly, although the motor assembly may be configured as a relatively small and light miniature motor assembly, high-speed rotation may be possible such that the motor assembly may provide, accordingly, an abundant airflow.

The impeller 130 may include, for example, the hub 1301 and the plurality of blades 1302 disposed around the hub 1301. The impeller 130 may be formed of, for example, a synthetic resin member.

The hub 1301 may include a reinforcing member 1303, for example, as shown in FIG. 2. The reinforcing member 1303 may be formed of a metal member to increase inertia. For example, the hub 1301 may be configured by injection-molding a synthetic resin member melted by inserting the reinforcing member 1303 into a mold.

The rotating shaft 211 may include a bearing assembly 215 between the impeller 130 and the rotor 210 in the axial direction. The bearing assembly 215 may include, for example, a first bearing 216 and a second bearing 217 spaced apart from each other along the axial direction and a spacer 218 inserted between the first bearing 216 and the second bearing 217.

The first bearing 216 and the second bearing 217 are implemented as, for example, ball bearings. The first bearing 216 and the second bearing 217 each include an outer ring 219, an inner ring 220 disposed concentrically inside the outer ring 219, and a plurality of balls 221 disposed between the outer ring 219 and the inner ring 220.

The spacer 218 is implemented, for example, in a cylindrical shape. One end of the spacer 218 may be in contact with the first bearing 216 and the other end of the spacer 218 is in contact with the second bearing 217. Accordingly, the first bearing 216 and the second bearing 217 may be spaced apart from each other by a preset distance along the axial direction.

In one embodiment, the rotating shaft 211 includes a permanent magnet coupling portion 2111 to which the permanent magnet 212 is coupled, a bearing assembly coupling portion 2112 to which the bearing assembly 215 is coupled, and an impeller coupling portion 2113 to which the impeller 130 is coupled. The bearing assembly coupling portion 2112 may be configured to have an expanded outer diameter, compared to the permanent magnet coupling portion 2111 and the impeller coupling portion 2113, such that lateral displacement of the rotating shaft 211 may be suppressed.

A bearing assembly accommodating portion 1202 is provided in the inner housing 120 to accommodate the bearing assembly 215. A stator accommodating portion 1201 is provided in the inner housing 120 so that the stator 150 may be inserted to a preset depth. The stator accommodating portion 1201 may be provided at one end (a lower end in the drawing) of the inner housing 120. The stator accommodating portion 1201 may be provided on one side (a lower side in the drawing) of the bearing assembly accommodating portion 1202. The stator accommodating portion 1201 may communicate with, for example, the bearing assembly accommodating portion 1202 and extends in a radial direction.

The stator accommodating portion 1201 may include, for example, a stator core coupling portion 12011 to which the stator core 160 is inserted and coupled and an insulator accommodating portion 12012 in which one end (an upper end in the drawing) of the insulator 180 is accommodated. The insulator accommodating portion 12012 may be disposed above the stator core coupling portion 12011 along the axial direction. The insulator accommodating portion 12012 may be configured to have a reduced inner diameter compared to the stator core coupling portion 12011.

The impeller 130 and the inner housing 120 may be configured to overlap each other along the axial direction. For example, a depression portion 1304 may be provided on a rear surface of the impeller 130 so that a front end of the inner housing 120 may be inserted. Accordingly, since the impeller 130 and the inner housing 120 overlap each other in the axial direction, an axial length of the motor assembly may be reduced. According to this configuration, the motor assembly of one embodiment may have a compact structure in which the external size is reduced in the radial direction and reduced in a length direction.

The inner housing 120 may include an insertion portion 1204 inserted into the depression portion 1304. The inner housing 120 may include a plurality of through portions 1203 penetrated in the axial direction so that air may move along the axial direction. The plurality of through portions 1203 are provided to communicate with the stator accommodating portion 1201. According to this configuration, when the impeller 130 rotates, the air outside the outer housing 110 may be sucked into the inside of the outer housing 110 and passes through the impeller 130 to move toward a downstream along the axial direction through the air flow path 115 provided on the downstream side.

Meanwhile, when the impeller 130 is rotated, the downstream side of the blade 1302 of the impeller 130 may be in a negative pressure lower than atmospheric pressure, and thus, air of the plurality of through portions 1203 may be moved between the housing 120 and the impeller 130, join the air moved by the impeller 130, and may then be moved to the downstream side along the air flow path 115. Accordingly, air is sucked through between the stator 150 and the PCB 250, and the sucked air comes into contact with the stator 150 and the rotor 210 to cool the stator 150 and the rotor 210. Thereafter, the air moves to the stator accommodating portion 1201 and then moves through the plurality of through portions 1203. Accordingly, cooling of the bearing assembly 215 may be promoted.

According to this configuration of the motor assembly, cooling of the bearing assembly 215 may be promoted by the air passing through the through portion 1203 despite an increase in the amount of heat generated by the bearing assembly 215 during a high-speed rotation, so that the bearing assembly 215 may be operated at a relatively low temperature. Accordingly, forced wear of the bearing assembly 215 due to high temperature may be remarkably suppressed, so that a service life of the bearing assembly 215 may be extended.

Figure 4:
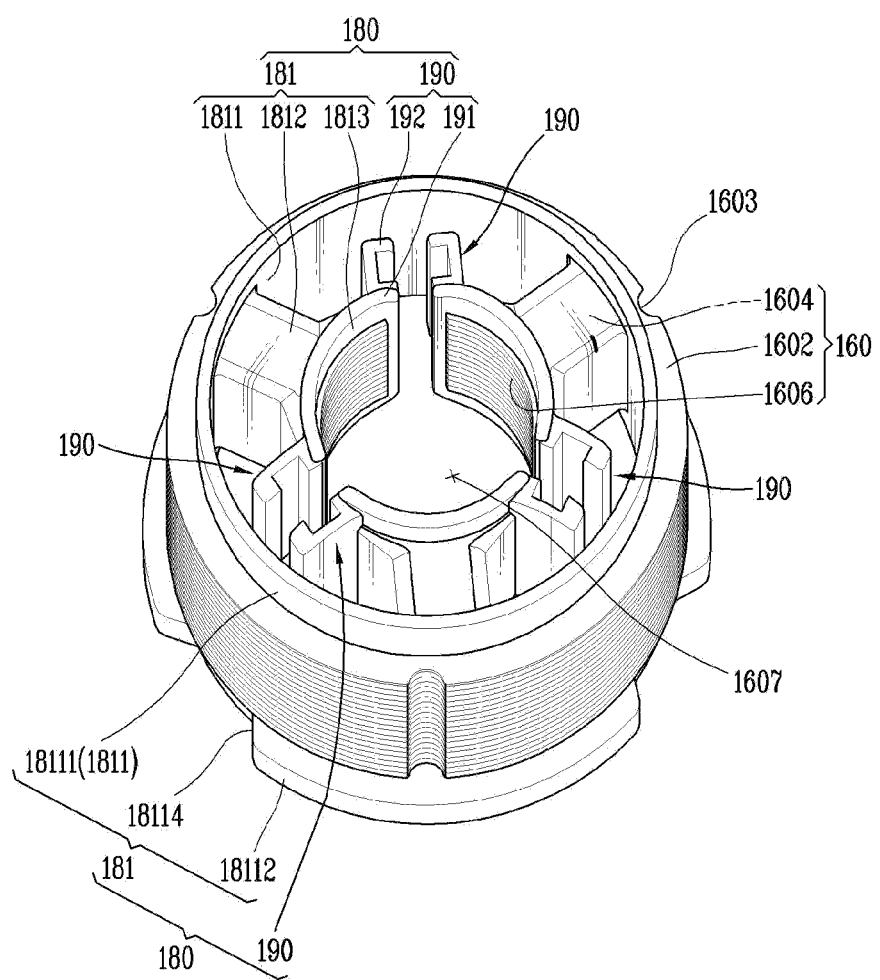
FIG. 4 is a perspective view before winding of the stator coil of the stator of FIG. 1.
Figure 5:
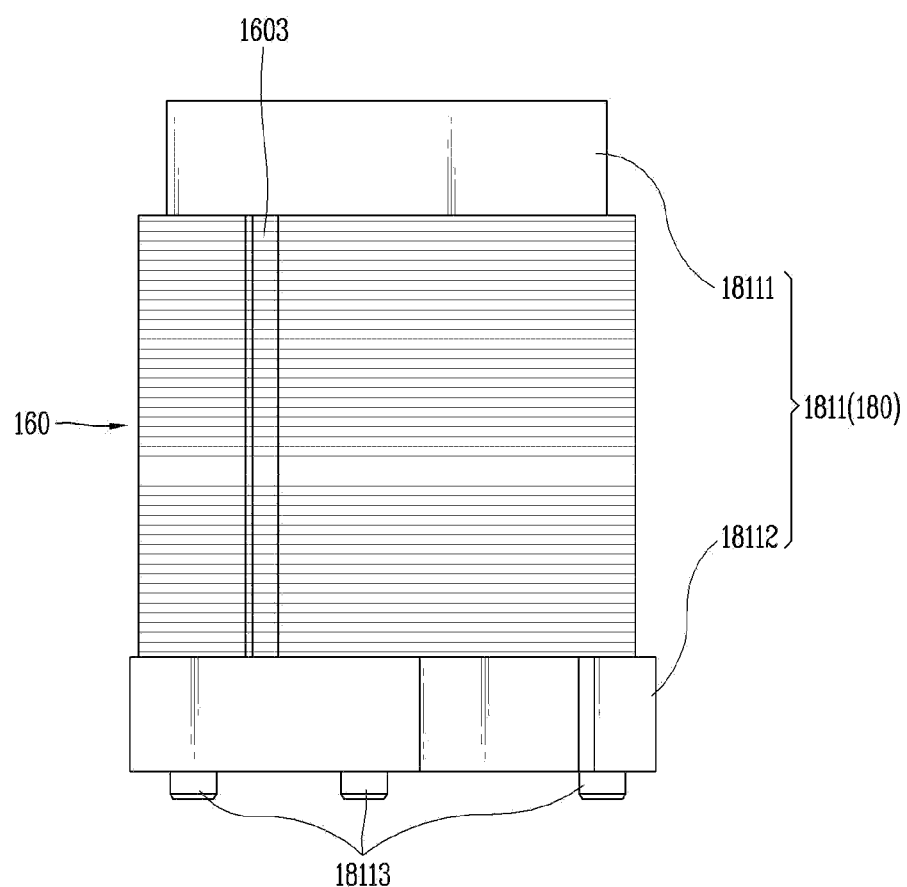
FIG. 5 is a side view of the stator of FIG. 4.
Figure 6:
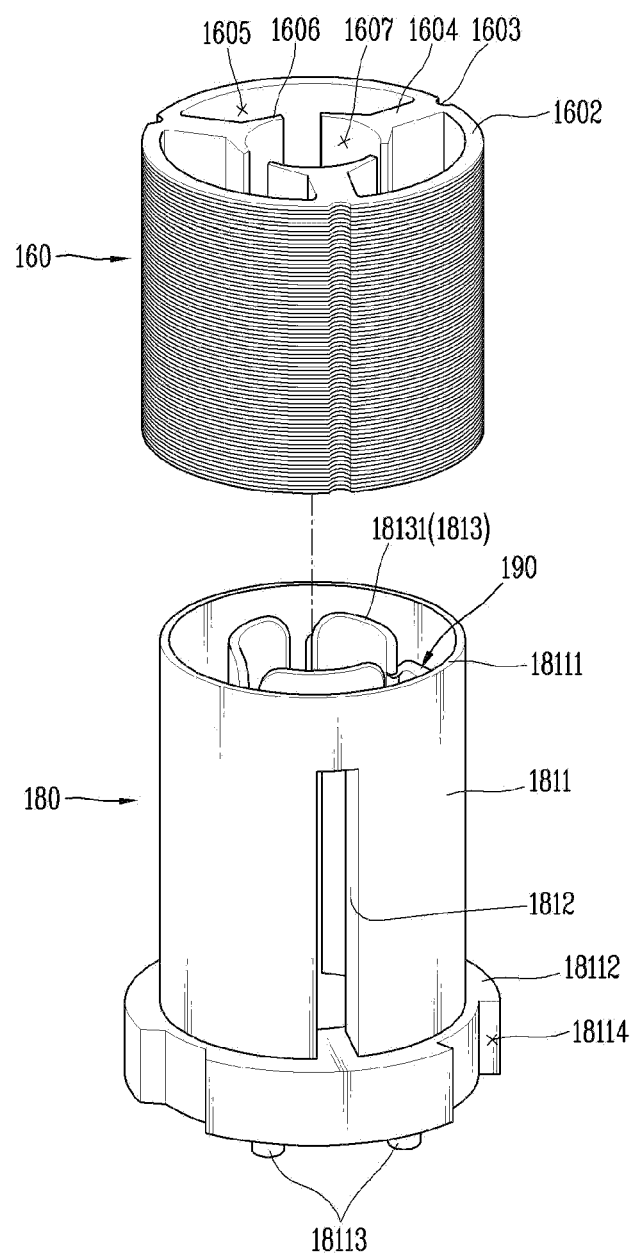
FIG. 6 is a view showing a stator core and an insulator of FIG. 4 separated to explain a structure.

FIG. 4 is a perspective view before winding of the stator coil 170 of the stator 150 of FIG. 1, FIG. 5 is a side view of the stator of FIG. 4, and FIG. 6 is a view showing a stator core and an insulator 180 of FIG. 4 separated to explain a structure. As shown in FIGS. 4 to 6, the insulator 180 may be manufactured by injection-molding a synthetic resin member. Although not specifically illustrated in the drawings, the insulator 180 may be molded by inserting the stator core 160 into an injection mold.

The stator core 160 may include a yoke 1602, a plurality of teeth 1604 protruding from an inner surface of the yoke 1602, and a shoe 1606 extending from each end of the plurality of teeth 1604 to both sides in the circumferential direction. The yoke 1602 may be implemented in a ring shape.

A plurality of recesses 1603 recessed inwardly along the radial direction and extending in the axial direction may be provided on an outer surface of the yoke 1602. The plurality of recesses 1603 may be configured to be spaced apart from each other at equal intervals along the circumferential direction, for example. The plurality of recesses 1603 may be disposed so that, for example, a center along a circumferential direction corresponds to a center of the tooth 1604. The centers of the plurality of recesses 1603 may be disposed on a connection line connecting the center of the teeth 1604 and the center of the stator core 160.

A plurality of teeth 1604 protruding in the radial direction and spaced apart from each other in the circumferential direction may be provided on an inner surface of the yoke 1602. The stator core 160 may be implemented, for example, to include three of teeth 1604. A slot 1605 may be disposed between two consecutive teeth 1604 along the circumferential direction. The stator core 160 is implemented to include three slots 1605. The teeth 1604 and slots 1605 are arranged alternately with each other along the circumferential direction.

One or more shoes 1606 extending in the circumferential direction may be disposed at ends of the plurality of teeth 1604, respectively. The shoe 1606 may be implemented in a substantially circular arc shape. An inner end 16061 of the shoe 1606 is configured to be disposed on the same circumference. The shoe 1606 may be configured such that a radial thickness gradually decreases along the circumferential direction. The inner end 16061 of the shoe 1606 may form a rotor accommodating hole 1607 in which the rotor 210 may be rotatably accommodated. The shoes 1606 may be spaced apart from each other at a preset interval along the circumferential direction. Accordingly, the slot 1605 may communicate with the rotor accommodating hole 1607.

Here, the preset interval of the shoe 1606 along the circumferential direction may be approximately 2.0 mm. When the interval between the shoes 1606 is increased more than 2.0 mm, torque (e.g., motor performance) may be reduced when the same current is input.

The insulator 180 may include an insulator body 181 surrounding and insulating the inner surface of the yoke 1602 and the circumferential surface of the teeth 1604. The insulator body 181 may further surround and insulate the outer surface of the shoe 1606 such that the inner end 16061 of the shoe 1606 may be exposed to the outside and a creepage distance extension portion 190 may extend a creepage distance between the stator coil 170 and the inner end 16061 of the shoe 1606.

The insulator body 181 may include a yoke insulating portion 1811 that insulates the inner surface of the yoke 1602. The insulator body 181 may include a teeth insulating portion 1812 that insulates a circumferential surface of the teeth 1604. The insulator body 181 may include a shoe insulating portion 1813 that insulates the outer surface of the shoe 1606.

The yoke insulating portion 1811 may implemented in a cylindrical shape. The yoke insulating portion 1811 may be provided to surround the inner surface of the yoke 1602. The yoke insulating portion 1811 may be configured to include an outer guide 18111 protruding from the teeth insulating portion 1812 along the axial direction (refer to FIG. 5).

The teeth insulating portion 1812 may be configured to surround the circumferential surface (an upper surface, a lower surface, and both side surfaces) of the tooth 1604.

The shoe insulating portion 1813 may be implemented to surround the outer surface of the shoe 1606 along the radial direction of the stator 150. The shoe insulating portion 1813 is configured to surround the upper surface, the lower surface, and both side surfaces of the shoe 1606.

Figure 7:
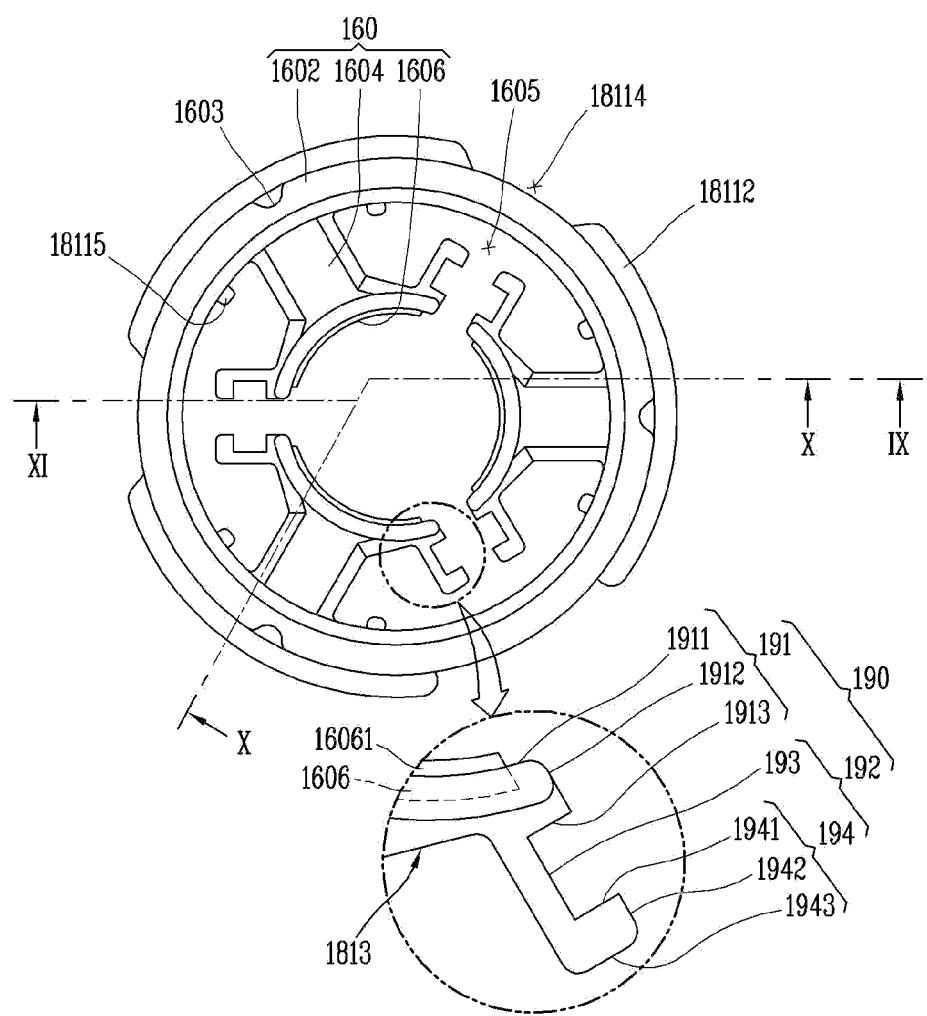
FIG. 7 is a plan view of the stator of FIG. 5.

In one embodiment, the shoe insulating portion 1813 may be provided so that the inner end 16061 of the shoe 1606 protrudes by a preset length along the radial direction (refer to FIG. 7). Accordingly, the inner end surface, the upper surface, the lower surface, and both side surfaces of the shoe 1606 may be exposed to the outside of the shoe insulating portion 1813 by the preset length.

The shoe insulating portion 1813 may be configured to have inner guides 18131 each protruding from the teeth insulating portion 1812 along the axial direction. Accordingly, separation (movement) of the stator coil 170 wound around the teeth insulating portion 1812 in the radial direction may be suppressed.

Connection pin coupling portions 18113 may be provided at one end (a lower end in the drawing) of the yoke insulating portion 1811 so that the connection pin 2502 may be coupled thereto. The connection pin coupling portions 18113 may be respectively disposed to protrude from the lower end of the yoke insulating portion 1811 in the axial direction.

The yoke insulating portion 1811 may be configured to include a protrusion 18112 protruding outwardly of the stator core 160 along the radial direction. The protrusion 18112 may have an outer diameter that is extended compared to the outer diameter of the stator core 160.

Figure 9:
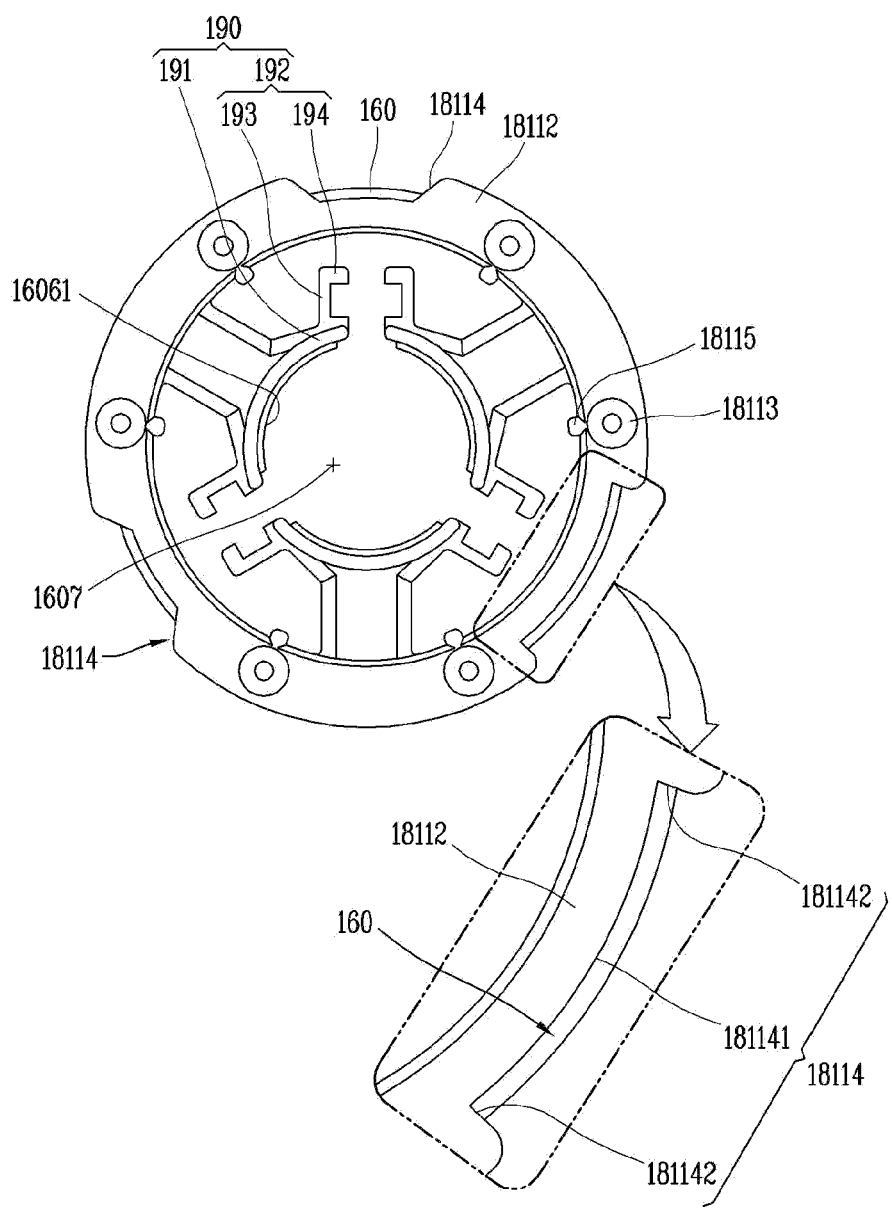
FIG. 9 is a bottom view of the stator of FIG. 8.

The protrusion 18112 may include, for example, a cutout portion 18114 cut inwardly to be smaller than the outer diameter of the stator core 160 (refer to FIG. 9). The cutout portions 18114 may be implemented, for example, as three portions. Although the cutout portion 18114 may be implemented as three portions, is illustrated in the drawings, but the cutout portion 18114 may be implemented as a unitary structure or two portions, or as having a more than three portions.

The cutout portion 18114 may be provided at a position corresponding to the slot 1605 along the circumferential direction. The cutout portion 18114 may be disposed between the teeth 1604 and 1604 along the circumferential direction.

The creepage distance extension portion 190 may be provided to protrude outwardly from the shoe insulating portion 1813. The creepage distance extension portion 190 may include an inner extension section 191 extending in the circumferential direction from the end of the shoe 1606 along the circumferential direction and an outer extension section 192 extending outwardly from the inner extension section 191. Here, the end of the creepage distance extension portion 190 may be spaced apart from the yoke insulating portion 1811 at a predetermined distance.

The preset distance between the end of the creepage distance extension portion 190 and the yoke insulating portion 1811 may be set to a degree (e.g., about 1.0 mm) that a wire 1702 is smoothly inserted in consideration of a wire diameter (e.g., 0.12 to 0.18 mm) of the wire 1702 of the stator coil 170 wound around the teeth insulating portion 1812.

In one embodiment, since the shoe 1606 may protrude from the shoe insulating portion 1813 inwardly along the radial direction by a preset length and the cutout portion 18114 may be cut to be smaller than the outer diameter of the stator core 160 is provided in the yoke insulating portion 1811, the stator core 160 may be easily supported during injection molding by inserting the stator core 160.

Referring to FIG. 6, the cutout portion 18114 may include a cutout portion forming portion (or mold) for forming the cutout portion 18114 to support a lower outer surface of the stator core 160, and a shoe insulating portion forming portion (or mold) for forming the shoe insulating portion 1813 may be disposed at the inner end 16061 of the shoe 1606 to support the inner end 16061 of the shoe 1606. In one example, a protrusion length of the shoe 1606 protruding from the inner diameter of the shoe insulating portion 1813 may be 0.2 mm. A minimum outer diameter of the cutout portion 18114, which may be reduced compared to the outer diameter of the stator core 160, may be configured to be reduced by 0.35 mm compared to the outer diameter of the stator core 160.

Figure 8:
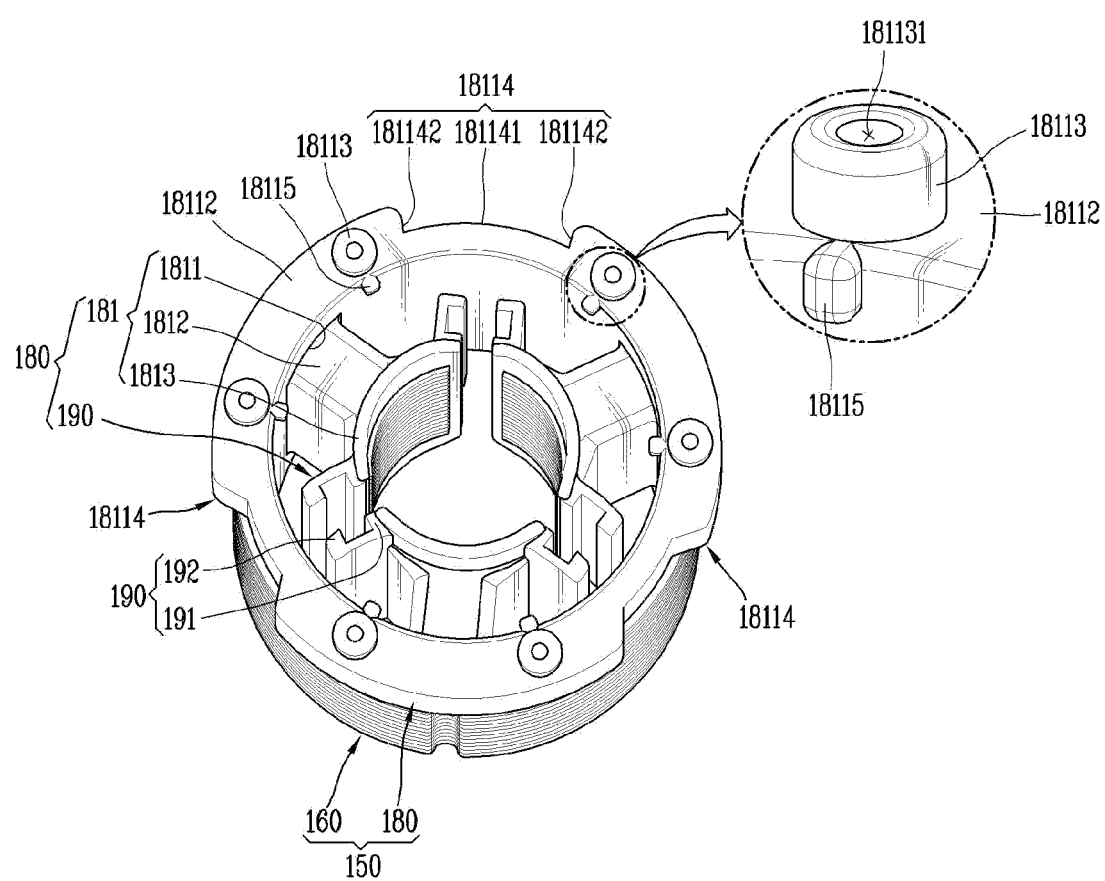
FIG. 8 is a bottom perspective view of the stator of FIG. 4.

FIG. 7 is a plan view of the stator 150 of FIG. 5, FIG. 8 is a bottom perspective view of the stator 150 of FIG. 4, and FIG. 9 is a bottom view of the stator 150 of FIG. 8. As shown in FIGS. 7 to 9, the yoke 1602 of the stator 150 may have a ring shape, and the yoke insulating portion 1811 may be implemented in a cylindrical shape inside the yoke 1602.

The teeth insulating portion 1812 may be provided inside the yoke insulating portion 1811 to surround and insulate the circumferential surface of the teeth 1604. The shoe insulating portion 1813 for insulating the shoe 1606 may extend from the teeth insulating portion 1812. The yoke insulating portion 1811, the teeth insulating portion 1812, and the shoe insulating portion 1813 may be integrally connected.

According to this configuration, compared to the insulator of the related art configured to be assembled along the axial direction, the yoke insulating portion 1811, the teeth insulating portion 1812, and the shoe insulating portion 1813 of one embodiment are integrally formed, so that there is no need to increase the thickness to form a structure for assembly, and thus, the thickness may be reduced. Accordingly, the space (slot 1605) for winding the stator coil 170 provided inside the yoke 1602, the teeth 1604, and the shoe 1606 may be substantially increased. Accordingly, the ratio (a space factor) of the cross-sectional area of the conductor (wire 1702) of the stator coil 170 to the cross-sectional area of the slot 1605 may be increased.

The inner end 16061 of the shoe 1606 may protrude from the inner surface of the shoe insulating portion 1813 in the radial direction. The protrusions 18112 may be provided on the outer side of the yoke 1602, and the plurality of cutout portions 18114 may be respectively provided in the protrusions 18112 to be spaced apart along the circumferential direction.

In the shoe insulating portion 1813, the creepage distance extension portion 190 may be provided so that the creepage distance between the stator coil 170 (the phase coil 1701) wound around the teeth insulating portion 1812 and the stator core 160 (the inner end 16061 of the shoe 1606) exposed from the shoe insulating portion 1813 may be formed.

The creepage distance extension portion 190 may include the inner extension section 191 extending in the circumferential direction from the end of the shoe 1606 along the circumferential direction and the outer extension section 192 extending outwardly from the inner extension section 191 to be implemented in a substantially "U" shape. Accordingly, the creepage distance between the stator coil 170 and the stator core 160 may be extended (increased) without increasing a radial size of the stator 150.

In one embodiment, the inner extension section 191 may have an inner diameter that is extended compared to the inner diameter of the inner end 16061 of the shoe 1606 so that the inner end 16061 of the shoe 1606 may protrude.

The outer extension section 192 may include a radial extension section 193 extending outwardly along the radial direction from the outer surface of the inner extension section 191 along the radial direction and a circumferential extension section 194 extending in the circumferential direction from the radial extension section 193. For example, the inner extension section 191 may include a first section 1911 extending in the circumferential direction from the inner end 16061 of the shoe 1606, a second section 1912 bent from the first section 1911 and extending in the radial direction, and a third section 1913 bent from the second section 1912 and extending in the circumferential direction.

Here, the first section 1911, the second section 1912, and the third section 1913 of the inner extension section 191 may be implemented to be substantially linear (straight line shape). The inner extension sections 191 may be spaced apart from each other along the circumferential direction so that an interval may be provided in which a nozzle 172 for winding the stator coil 170 around the teeth insulating portion 1812 may be inserted to make a relative motion. The nozzle 172 may have a width of, for example, 0.9 mm, and the interval between the inner extension sections 191 may be preferably implemented as 1.2 mm.

The radial extension section 193 may be bent from the third section 1913 to extend outwardly in the radial direction. Here, the radial extension section 193 may be configured to be substantially linear.

The circumferential extension section 194 includes a first section 1941 bent from the radial extension section 193 to extend in the circumferential direction, a second section 1942 bent from the first section 1941 to extend outwardly in the radial direction, and a third section 1943 bent from the second section 1942 to extend in the circumferential direction. Here, the first section 1911, the second section 1942, and the third section 1943 of the circumferential extension section 194 may be implemented to be substantially linear (straight line shape). The circumferential extension sections 194 may be spaced apart from each other along the circumferential direction so that an interval may be configured in which the nozzle 172 for winding the stator coil 170 around the teeth insulating portion 1812 may be inserted to make a relative motion.

As illustrated in FIGS. 8 and 9, the insulator 180 (the yoke insulating portion 1811) may include a plurality of connection pin coupling portions 18113 so that the connection pin 2502 may be coupled. The plurality of connection pin coupling portions 18113 may be respectively provided to protrude from the lower ends of the protruding portions 18112 in the axial direction.

The connection pin coupling portion 18113 may be configured to correspond to each of the phase coils 1701. Two connection pin coupling portions 18113 may be provided in each of the phase coils 1701. Connection pin accommodating holes 181131 may be respectively configured to be recessed in the connection pin coupling portion 18113 so that each of the connection pins 2502 may be inserted. The connection pin coupling portions 18113 may be respectively provided on both sides of the teeth 1604 along the circumferential direction.

The insulator 180 may include a plurality of guide protrusions 18115 guiding the wires 1702 of the stator coil 170 (phase coil 1701) electrically connected to the connection pins 2502, respectively. The plurality of guide protrusions 18115 may be provided on, for example, the inside of the connection pin coupling portions 18113, respectively. The plurality of guide protrusions 18115 may be configured to respectively protrude inwardly from the yoke insulating portions 1811 in a radial direction.

In one embodiment, the guide protrusion 18115 may be formed, for example, to have a curved outer surface which is convex outwardly. More specifically, for example, the outer surfaces of the guide protrusions 18115 may be configured to have convex cross-sections in the axial direction and the circumferential direction, respectively. Accordingly, when coming into contact with the wire 1702 of the stator coil 170, the occurrence of damage to the wire 1702 may be suppressed.

The protrusion 18112 of the insulator 180 may have an outer diameter that is extended compared to the outer diameter of the stator core 160, and the protrusion 18112 may include a plurality of cutout portions 18114 cut to have a minimum outer diameter smaller than an outer diameter of the stator core 160. The plurality of cutout portions 18114 may be configured to include both sidewall portions 181142 disposed in a radial direction and a recessed bottom portion 181141 connecting both the sidewall portions 181142, respectively.

The plurality of cutout portions 18114 may be implemented in three pieces. Any one of the three cutout portions 18114 may be implemented in a different shape compared to the other two cutout portions 18114. Accordingly, it may be easy to identify the three cutout portions 18114, so that the stator coil 170 (the phase coil 1701) wound around each of the teeth 1604 and the PCB 250 may be easily connected. In the drawings, an example in which the cutout portions 18114 are configured to be distinguished by an inclination angle of both side wall portions 181142 is illustrated.

Figure 10:
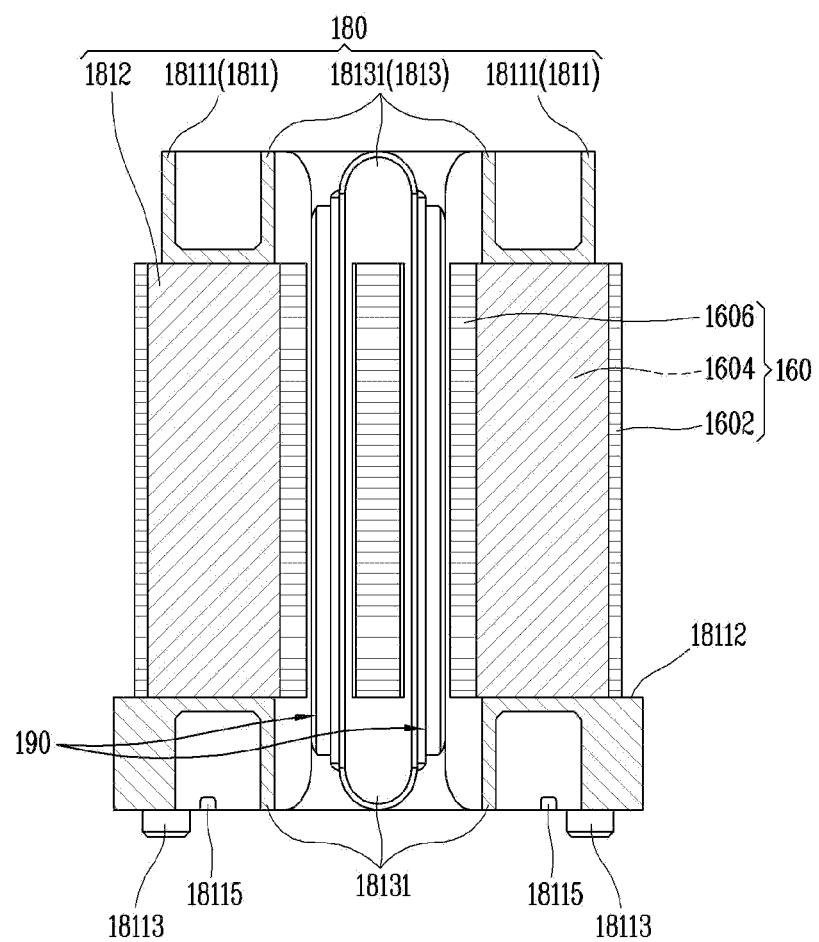
FIG. 10 is a cross-sectional view taken along line X-X of the stator of FIG. 7.
Figure 11:
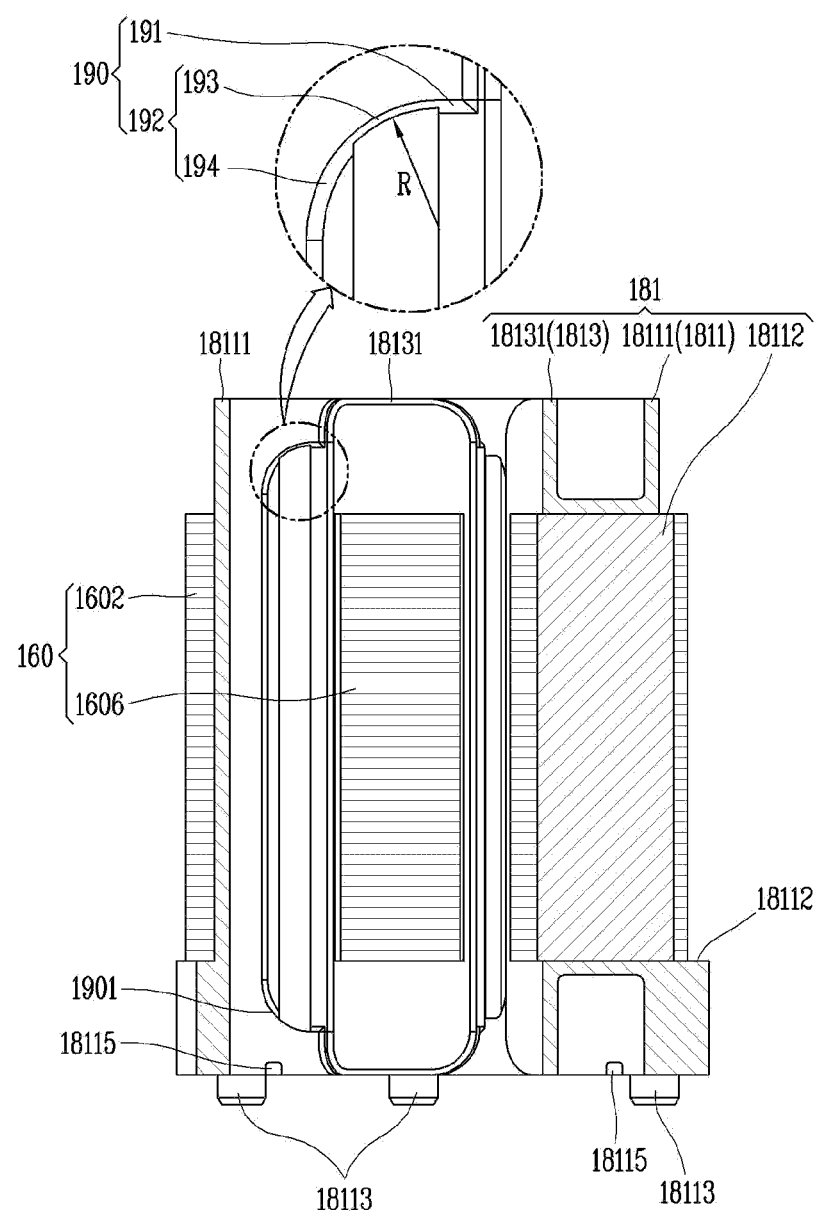
FIG. 11 is a cross-sectional view taken along line XI-IX of the stator of FIG. 7.

FIG. 10 is a cross-sectional view taken along line X-X of the stator 150 of FIG. 7, and FIG. 11 is a cross-sectional view taken along line XI-IX of the stator 150 of FIG. 7. As shown in FIGS. 10 and 11, the yoke insulating portion 1811 may be provided inside the yoke 1602 of the stator core 160 having a cylindrical shape. The yoke insulating portion 1811 may have a substantially cylindrical shape, and the yoke insulating portion 1811 may include outer guides 18111 extending to both sides of the yoke 1602 in the axial direction, respectively. The outer guide 18111 may have a cylindrical shape.

In the drawings, the protrusion 18112 protruding outward compared to the yoke 1602 may be disposed below the yoke insulating portion 1811. The cutout portion 18114 may be disposed in the protrusion 18112 to have a smaller minimum outer diameter than the outer diameter of the stator core 160. At the lower end of the protrusion 18112, the connection pin coupling portion 18113 may protrude downwardly. Guide protrusions 18115 for guiding the wires 1702 of the stator coil 170 may be provided inside the connection pin coupling portions 18113, respectively. The teeth insulating portion 1812 may be provided inside the yoke insulating portion 1811.

A shoe insulating portion 1813 for insulating the shoe 1606 may be provided inside the teeth insulating portion 1812 along the radial direction so that the inner end 16061 of the shoe 1606 is exposed. The shoe insulating portion 1813 may have inner guides 18131 extending to both sides from the teeth 1604 (shoe 1606) along the axial direction. The inner guide 18131 may have an arc shape with a center convex outwardly. The shoe insulating portion 1813 may have an arc shape convex outwardly along the radial direction, and may have an arc shape with a center convex outwardly along the axial direction.

The creepage distance extension portion 190 protruding from the outer surface of the shoe insulating portion 1813 may be configured at the shoe insulating portion 1813. In one embodiment, both ends of the creepage distance extension portion 190 along the axial direction may protrude from the teeth 1604 by a preset length. Here, the preset length of both ends of the creepage distance extension portion 190 from the tooth insulation portion 1812 may be set to, for example, approximately 2.5 mm.

At both ends of the creepage distance extension portion 190 along the axial direction, the guide surfaces 1901 which are configured to gradually decrease in axial length outwardly along the radial direction may be provided, respectively. Accordingly, when the stator coil 170 is wound around the teeth insulating portion 1812, winding of the wire 1702 of the stator coil 170 on the end surface of the creepage distance extension portion 190 may be suppressed.

Here, when the wire 1702 of the stator coil 170 is wound around the teeth insulating portion 1812 for about 200 turns or more, the wire 1072 may be wound by way of both end surfaces of the creepage distance extension portion 190 along the axial direction. When the wire 1702 continues to be in contact with the end of the creepage distance extension portion 190, cracks and/or damage to the wire 1702 in contact with the end may increase.

In one embodiment, the creepage distance extension portion 190 may be provided with the guide surface 1901, so that winding of the wire 1702 of the stator coil 170 on the end surface of the creepage distance extension portion 190 may be suppressed, and accordingly, the occurrence of cracks and/or damage to the wire 1702 due to contact with the end of the creepage distance extension portion 190 may be suppressed.

The guide surface 1901 may, for example, be implemented as an arc having a radius R of a preset size, as shown in FIG. 11. Here, the radius R of the preset size of the guide surface 1901 may be set to, for example, approximately 1.8 mm. According to this configuration, when the stator coil 170 is wound, the wire 1702 of the stator coil 170 may be guided to the guide of the teeth insulating portion 1812, the guide of the yoke insulating portion 1811, and the space provided inside the creepage distance extension portion 190 by the guide surface 1901 and wound in the guide of the teeth insulating portion 1812, the guide of the yoke insulating portion 1811 and inside the creepage distance extension portion 190 along the circumferential surface of the tooth insulation portion 1812. Accordingly, the occurrence of disconnection of the wire 1702 of the stator coil 170 may be suppressed. The guide surface 1901 has an axial length smaller than the axial length of the outer guide 18111 and the inner guide 18131.

Figure 12:
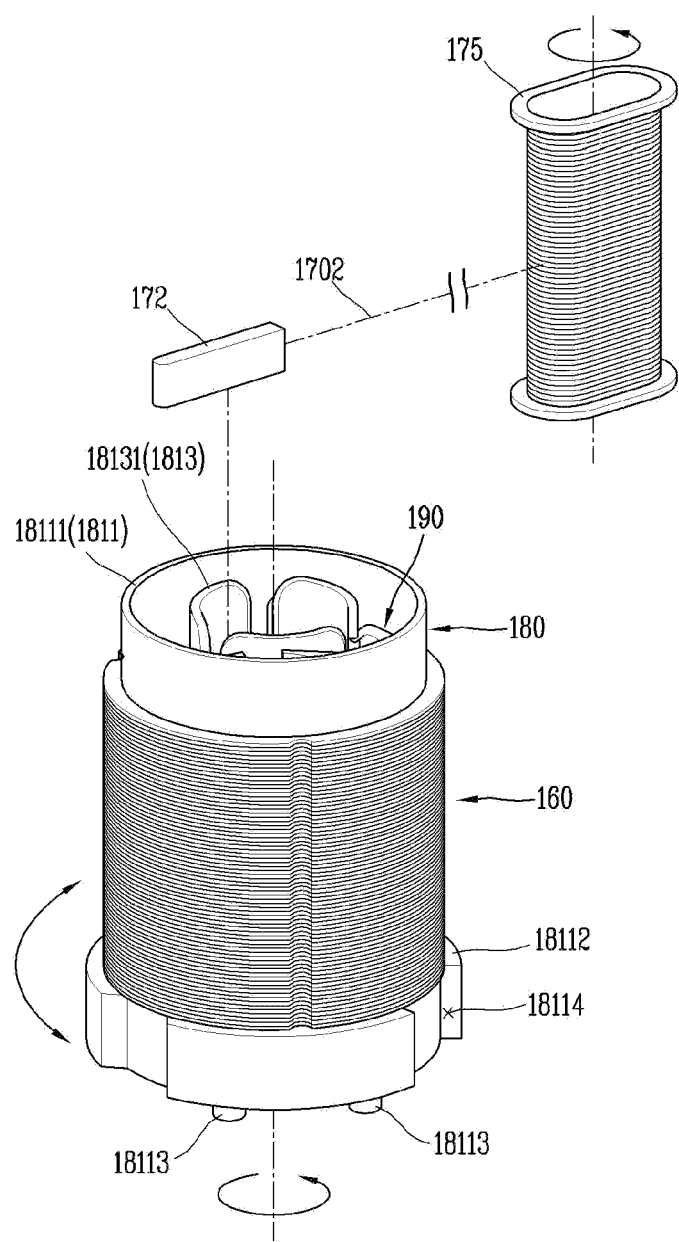
FIG. 12 is a view illustrating a winding process of a stator coil on the stator of FIG. 4.
Figure 13:
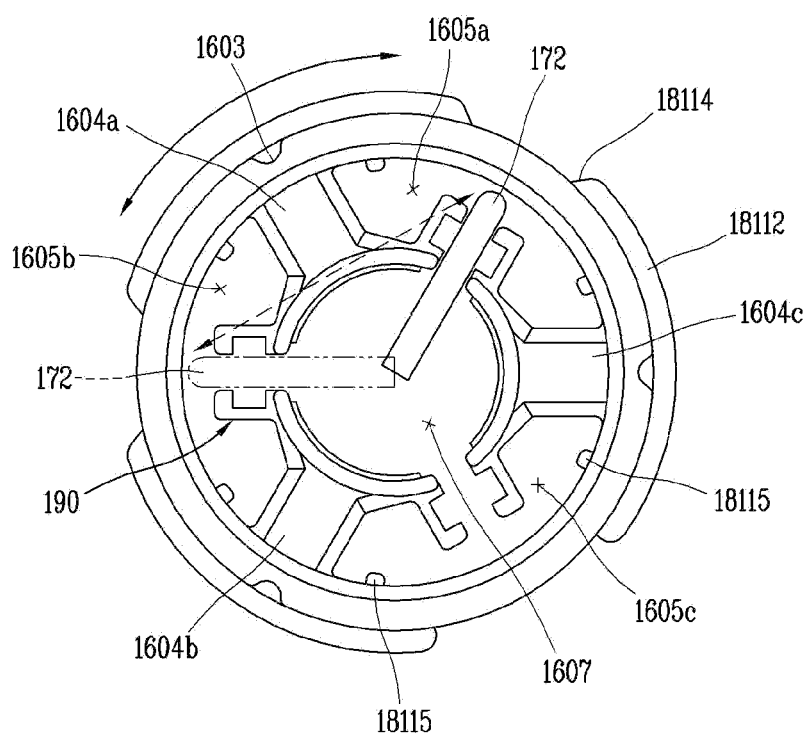
FIG. 13 is a plan view of the stator of FIG. 12.
Figure 14:
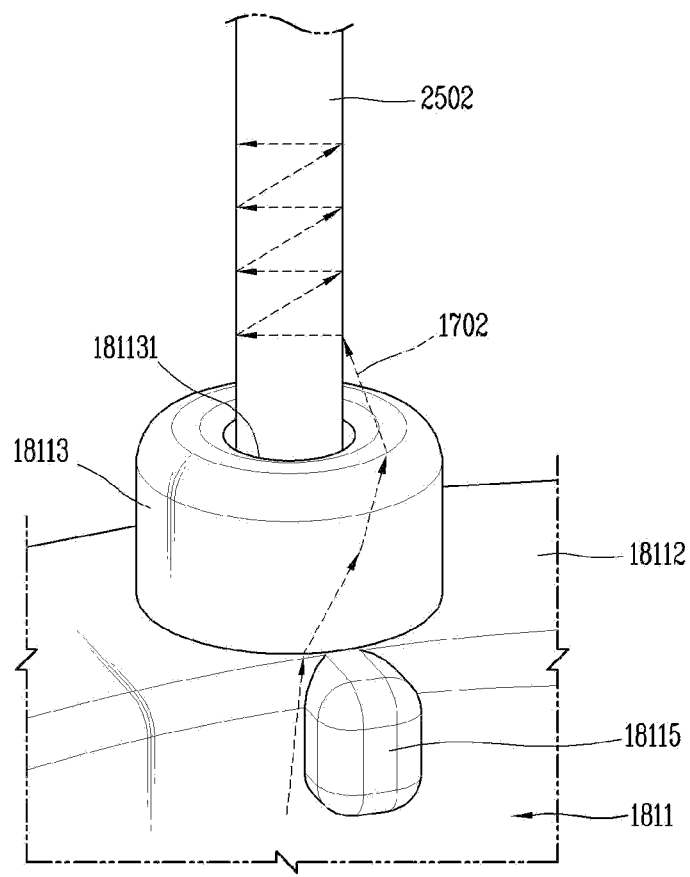
FIG. 14 is a view illustrating a method of connecting a wire after winding a stator coil around the stator core of FIG. 4.

FIG. 12 is a view illustrating a winding process of a stator coil 170 on the stator 150 of FIG. 4, FIG. 13 is a plan view of the stator 150 of FIG. 12, and FIG. 14 is a view illustrating a method of connecting a wire 1702 after winding a stator coil 170 around the stator core 160 of FIG. 4. As described above, the insulator 180 may be integrally configured by inserting the stator core 160.

The stator coil 170 may be wound on the stator core 160 on which the insulator 180 is integrally formed. The connection pins 2502 may be respectively coupled to the connection pin coupling portions 18113 of the stator 150. As shown in FIG. 12, the stator coil 170 may be wound around the teeth 1604 using the nozzle 172 disposed to correspond to the opening of the slot 1605.

The wire 1702 to be wound around the teeth 1604 of the stator core 160 may be connected to the nozzle 172, for example. The wire 1702 connected to the nozzle 172 may be wound around the bobbin 175, and the bobbin 175 may be configured to be rotatable so that the wire 1702 may be unwound and drawn out when a tensile force is applied to the wire 1702. The nozzle 172 may be configured to be liftable along the vertical direction of the stator core 160.

For example, the nozzle 172 may be disposed above the opening of the first slot 1605 on one side of the first tooth 1604a of the stator core 160 on which the wire 1702 is to be wound. When the winding operation of the stator coil 170 is started, the nozzle 172 may be lowered via the first slot 1605a. When the nozzle 172 is lowered, as shown in FIG. 13, the stator core 160 may rotate along the circumferential direction so that the second slot 1605b on the other side of the first tooth 1604a may be disposed on the upper side of the nozzle 172. When the rotation of the stator core 160 is completed, the nozzle 172 may move to an upper side of the stator core 160 via the second slot 1605b. Next, in the stator core 160, the first slot 1605a may be rotated reversely to correspond to the nozzle 172. Through this process, the wire 1702 passing through the nozzle 172 may be wound around the first tooth 1604a. At this time, the guide surfaces 1901 respectively provided at the upper end and the lower end of the creepage distance extension portion 190 guide the wire 1702 to the inside of the creepage distance extension portion 190 when the wire 1702 passing through the nozzle 172 may be in contact with the end of the creepage distance extension portion 190.

When winding is completed with a preset number of turns (e.g., 200 to 232 turns) around the first tooth 1604a, as shown in FIG. 14, the wire 1702 may be connected to the connection pin 2502. The wire 1702 wound around the teeth 1604 may be supported by the guide protrusion 18115 via one side of the guide protrusion 18115. Accordingly, when an external force is applied to the motor assembly, the vibration of the wire 1702 may be suppressed, so that the occurrence of disconnection of the wire 1702 due to the vibration may be suppressed.

The wire 1702 passing through the guide protrusion 18115 may be wound around the connection pin 2502 by a preset number of times. The wire 1702 wound around the connection pin 2502 by the preset number of times (e.g., 4 times) may be electrically connected to the connection pin 2502. The wire 1702 wound around the connection pin 2502 may be fixedly coupled to the connection pin 2502 by, for example, brazing. Here, before being wound around the teeth 1604, the wire 1702 may be wound around another connection pin 2502 by a preset number of times as described above, and then may be wound around the teeth 1604 by the method described above.

Meanwhile, after the wire 1702 and the connection pin 2502 are connected, the wire 1702 may be fixed to the guide protrusion 18115. For example, the wire 1702 may be coupled (bonded) to the guide protrusion 18115 by an adhesive. Accordingly, the occurrence of damage (disconnection) of the wire 1702 due to vibration occurring during the operation of the motor assembly may be further suppressed.

Figure 15:
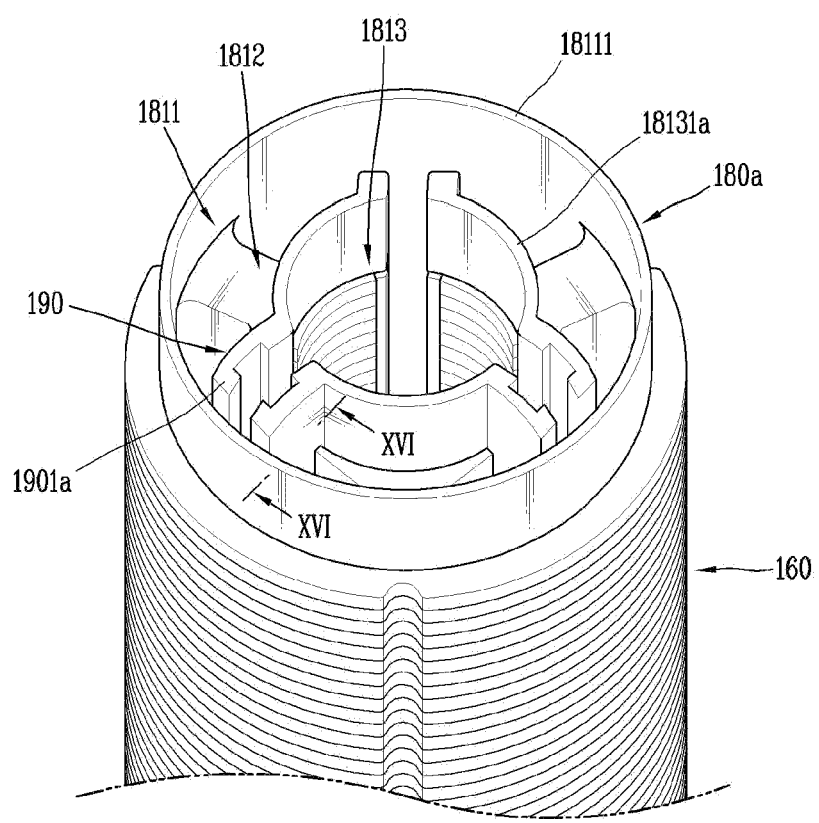
FIG. 15 is a view showing a partial region of a stator of a motor assembly according to another embodiment of the present disclosure.
Figure 16:
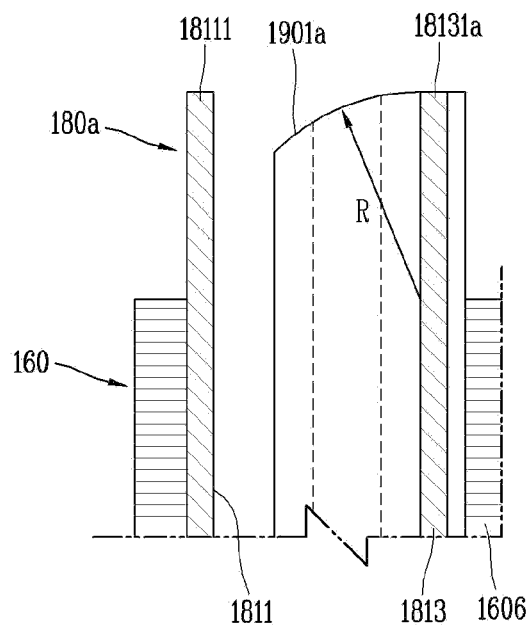
FIG. 16 is a partial cross-sectional view of FIG. 15.
Figure 17:
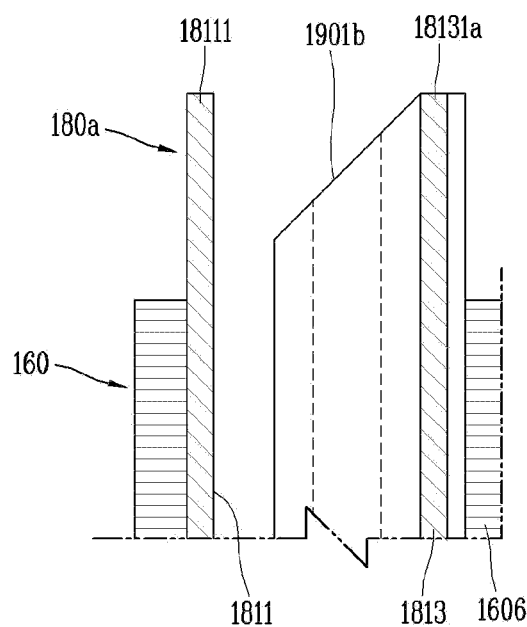
FIG. 17 is a modified example of the stator of FIG. 15.

FIG. 15 is a view showing a partial region of a stator 150 of a motor assembly according to another embodiment of the present disclosure, FIG. 16 is a partial cross-sectional view of FIG. 15. And FIG. 17 is a modified example of the stator 150 of FIG. 15. As described above, the motor assembly according to an embodiment of the present disclosure includes a stator 150 and a rotor 210. The stator 150 may include a stator core 160, a stator coil 170 wound around the stator core 160, and an insulator 180a insulating the stator core 160 and the stator coil 170. The stator core 160 includes a yoke 1602, a plurality of teeth 1604 protruding inside the yoke 1602, and a shoe 1606 extending from an end of the tooth 1604.

The insulator 180a may be injection-molded by inserting the stator core 160 as described above. The insulator 180a may include a yoke insulating portion 1811 insulating the yoke 1602, a teeth insulating portion 1812 insulating the teeth 1604, and a shoe insulating portion 1813 insulating the shoe 1606. It should be appreciated that the insulator 180a may include fewer, additional, and/or different parts.

As shown in FIG. 15, the yoke insulator 1811 may include an outer guide 18111 protruding from the yoke (teeth 1604) in the axial direction. The outer guide 18111 is implemented, for example, in a cylindrical shape.

The shoe insulating portion 1813 may include an inner guide 18131a protruding from the shoe 1606 along the axial direction. The inner guide 18131a may configured to have the same axial length. The shoe insulating portion 1813 may have the same length along the axial direction.

The shoe insulating portion 1813 may include the creepage distance extension portion 190 protruding from an outer surface of the shoe insulating portion 1813. The creepage distance extension portion 190 may include an inner extension section 191 extending in a circumferential direction from the shoe 1606 and an outer extension section 192 extending outwardly from an outer surface of the inner extension section 191.

The creepage distance extension portion 190 may be provided with guide surfaces 1901*a* at both ends along the axial direction so that the axial length may be gradually reduced outwardly along a radial direction. The guide surface 1901*a*, for example, may be provided such that the axial length is gradually decreased from both ends of the inner guide 18131*a* of the shoe insulating portion 1813.

The guide surface 1901*a* may be implemented in an arc shape having a preset radius R, for example, as shown in FIG. 16. The guide surface 1901*b* may be configured to be inclined downwardly to the outside from an upper end of the inner guide 18131*a* of the shoe insulating portion 1813, for example, as shown in FIG. 17. The guide surface 1901*b* may be provided at the inner guide 18131*a* of the shoe insulating portion 1813 disposed below the stator core 160, and the guide surface 1901*b* may be configured to be inclined upwardly to the outside from a lower end of the inner guide 18131*a* of the shoe insulating portion 1813.

Figure 18:
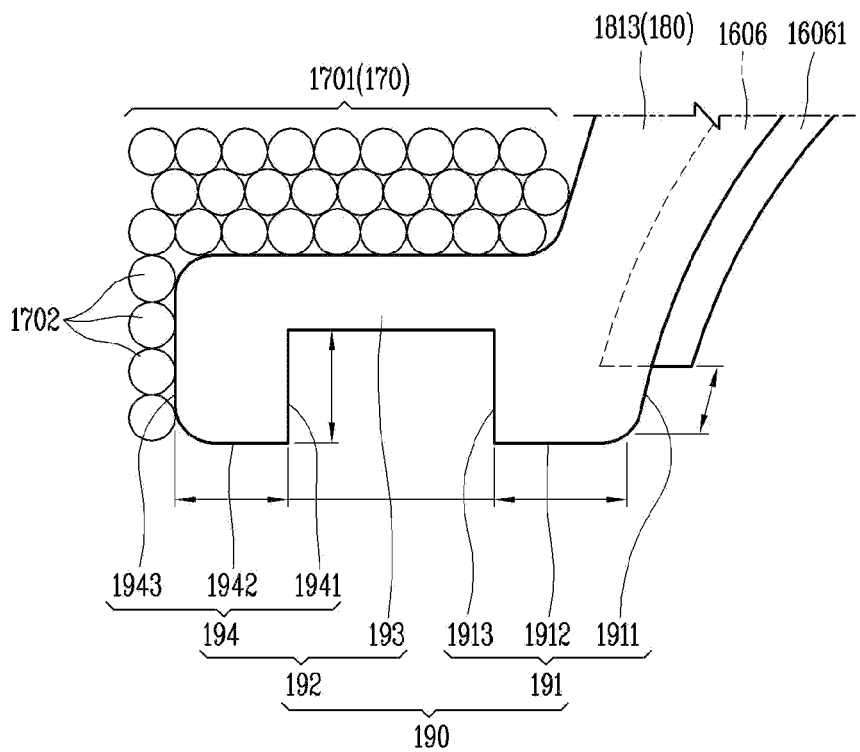
FIG. 18 is an enlarged view of a creepage distance extension portion of FIG. 6.

FIG. 18 is an enlarged view of the creepage distance extension portion 190 of FIG. 6. As shown in FIG. 18, the stator coil 170 may be actually wound inside the creepage distance extension portion 190, and a creepage distance between the stator coil 170 and the stator core 160 will be described in consideration of a situation in which the creepage distance may be minimized as the wire 1702 of the stator coil 170 is wound on an end of the creepage distance extension portion 190.

In one embodiment, the shoe 1606 may be configured such that an inner end 16061 protrudes from the insulator 180 (the shoe insulating portion 1813) along a radial direction. The creepage distance extension portion 190 may include at least one inner extension section 191, each extending in the circumferential direction from the end of the shoe 1606 along the circumferential direction, and at least one outer extension section 192, each extending outwardly from the inner extension section 191.

As described above, the inner extension section 191 may include a first section 1911 extending along the circumferential direction from the end of the shoe 1606, a second section 1912 bent from the first section 1911 and extending in a radial direction, and a third section 1913 extending in the circumferential direction from the second section 1912.

The outer extension section 192 may include a radial extension section 193 extending in a radial direction from the inner extension section 191, and a circumferential extension section 194 extending in a circumferential direction from the radial extension section 193. The radial extension section 193 may be bent and extended from the third section 1913 of the inner extension section 191.

The circumferential extension section 194 may include a first section 1941 bent from the radial extension section 193 and extending in the circumferential direction, a second section 1942 bent from the first section 1941 and extending in the radial direction, and a third section 1943 bent from the second section 1942 and extending in the circumferential direction.

In one embodiment, the wire 1702 of the stator coil 170 may be wound on the outer surface of the third section 1943 of the circumferential extension section 194, and the third section 1943 may be excluded from the entire creepage distance. In certain examples, the third section 1913 of the inner extension section 191 and the first section 1941 of the circumferential extension section 194 of the outer extension section 192 may be parallel to each other and may have the same length, but in other examples, the third section 1913 and the first section 1941 may have different lengths and may not be parallel to each other.

In this example, referring to the creepage distance between the stator coil 170 and the stator core 160, the first section 1911 of the inner extension section 191 may be configured to be 0.4 mm, the second section may be configured to be 0.75 mm, and the third section may be configured to be 0.6 mm. The radial extension section 193 of the outer extension section 192 may be implemented as 1.1 mm, the first section 1941 of the circumferential extension section 194 of the outer extension section 192 may be implemented as 0.6 mm, and the second section 1942 may be implemented as 0.6 mm. Here, the third section 1943 of the circumferential extension section 194 may be configured to be 1.0 to 1.1 mm.

In this particular example, the creepage distance between the stator coil 170 and the stator core 160 extended by the creepage distance extension portion 190 may be secured as at least 0.4+0.75+0.6+1.1+0.6+0.6=4.05 mm. In addition, when the stator coil 170 is wound inside the creepage distance extension portion 190, since the third section 1943 of the outer extension section 192 is additionally included in the total creepage distance, the total creepage distance may be secured as 4.05+1.0(1.1)=5.05 (5.15) mm. Accordingly, the possibility of the occurrence of adverse effects due to leakage current due to inflow of foreign matter between the stator coil 170 and the stator core 160 may be significantly reduced.

Figure 19:
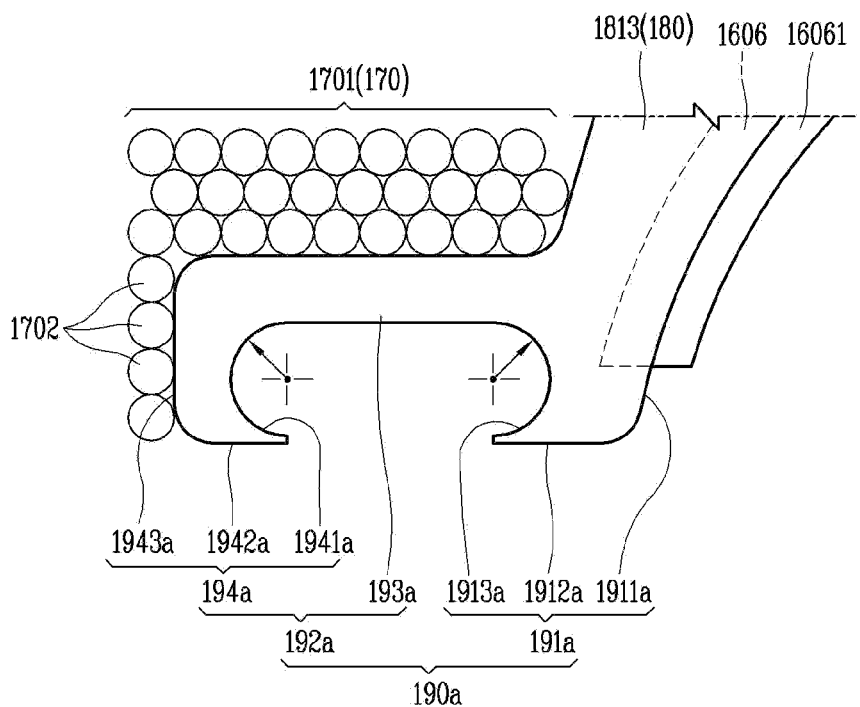
FIG. 19 is a modified example of the creepage distance extension portion of FIG. 18.

FIG. 19 is a modified example of the creepage distance extension portion 190 of FIG. 18. As shown in FIG. 19, a creepage distance extension portion 190*a* of the present embodiment may include an inner extension section 191*a* extending in the circumferential direction from the end of the shoe 1606 along the circumferential direction and an outer extension section 192*a* extending outwardly from the inner extension section 191*a*.

In one embodiment, the inner extension section 191*a* or the outer extension section 192*a* may be configured to include curved sections 1913*a* and 1941*a* so that the creepage distance may be further extended. The inner extension section 191*a* may include, for example, a first section 1911*a* extending in the circumferential direction from the shoe 1606, a second section 1912*a* bent from the first section 1911*a* and extending in the radial direction, and a third section 1913*a* extending in a curved shape from the second section 1912*a*.

The third section 1913*a* may be implemented as, for example, a circular arc (a semicircle) having a radius of a preset size. Here, the third section 1913*a* may be spaced apart from the second section 1912*a* by a predetermined length in the circumferential direction. Here, the predetermined length at which the third section 1913*a* may be spaced apart from the second section 1912*a* in the circumferential direction may be, for example, about 1.0 mm. Accordingly, the formation of a peak at which a boundary region between the second section 1912*a* and the third section 1913*a* becomes sharp may be suppressed.

The outer extension section 192*a* may include a radial extension section 193*a* extending in the radial direction from the inner extension section 191*a* and a circumferential extension section 194*a* extending in the circumferential direction from the radial extension section 193*a*.

The circumferential extension section 194*a* may include, for example, a first section 1941*a* extending in a curved shape in the circumferential direction from the end of the radial extension section 193a, a second section 1942a extending from the first section 1941a in the radial direction, and a third section 1943a bent from the second section 1942a and extending in the circumferential direction. In the current description, the third section 1913a of the inner extension section 191a configured as a curved section may be referred to as a first curved section, and the first section 1941a of the circumferential extension section 194a may be referred to as a second curved section.

In one embodiment, the third section 1913a of the first curved section (the third section 1913a of the inner extension section 191a) and the first section 1941a of the second curved section (the first section 1941a of the circumferential extension section 194a) may each have a first radius, and thus, the creepage distance may be further increased, compared to the case of connecting the second section 1912a of the inner extension section 191a and the radial extension section 193a and connecting the radial extension section 193a and the first section 1941a as straight lines (twice the first radius).

Figure 20:
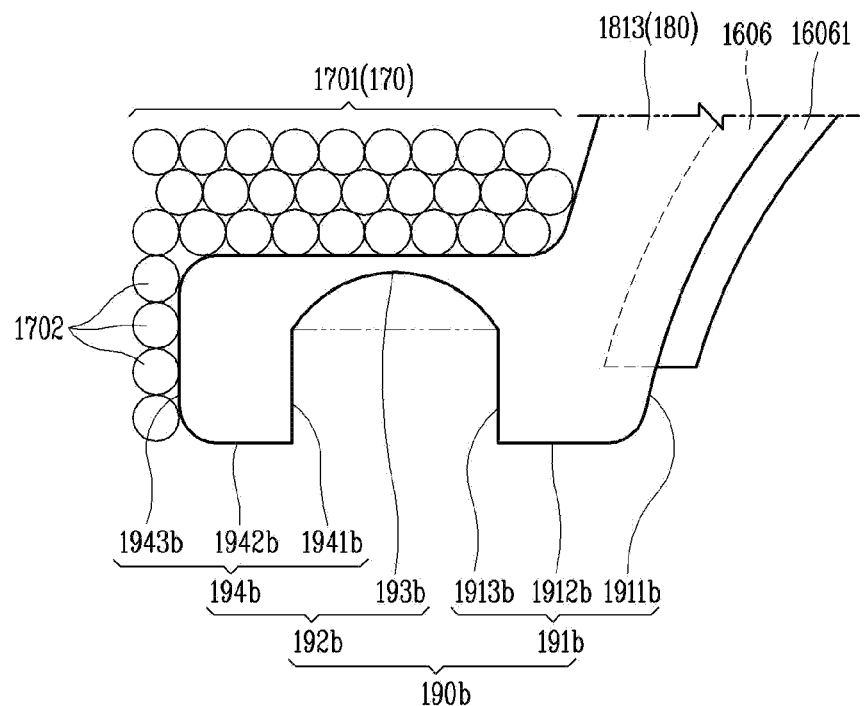
FIG. 20 is a modified example of the creepage distance extension portion of FIG. 18.

FIG. 20 is a modified example of the creepage distance extension portion 190 of FIG. 18. As shown in FIG. 20, in one embodiment, a creepage distance extension portion 190b may include an inner extension section 191b extending in the circumferential direction from the end of the shoe 1606 and an outer extension section 192b extending outwardly from the inner extension section 191b.

The outer extension section 192b may include a radial extension section 193b extending in the radial direction from the inner extension section 191b and a circumferential extension section 194b extending in the circumferential direction from the radial extension section 193b. In one embodiment, the outer extension section 192b may be configured to have a curved section 193b so that the creepage distance may be extended.

The curved section 193b may be configured to extend in a curved shape along the radial direction from the third section 1913b of the inner extension section 191b, for example. Accordingly, the creepage distance between the stator coil 170 and the stator core 160 may be further increased.

Figure 21:
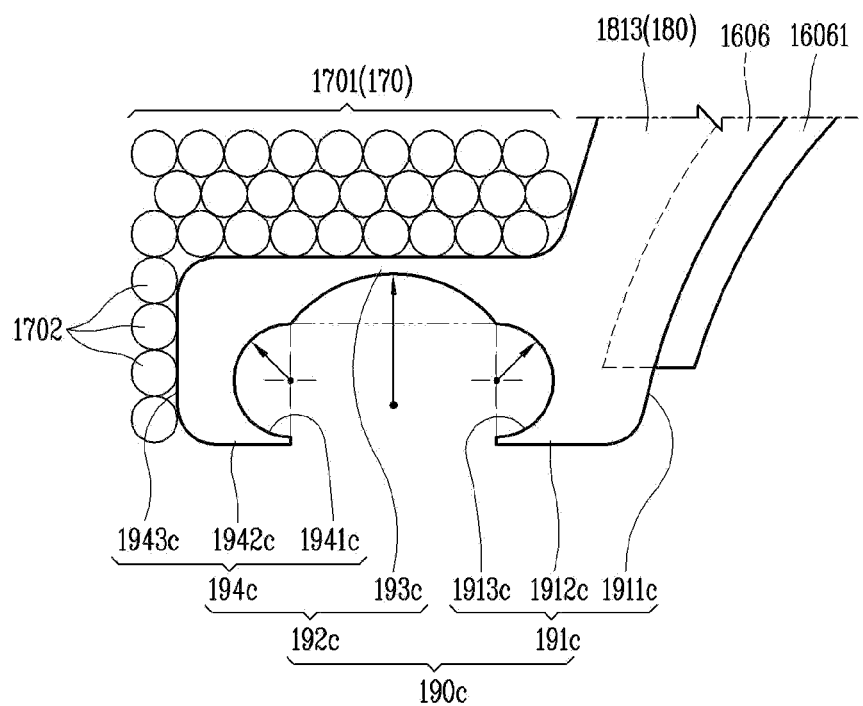
FIG. 21 is a modified example of the creepage distance extension portion of FIG. 18.

FIG. 21 is a modified example of the creepage distance extension portion 190 of FIG. 18. As shown in FIG. 21, in one embodiment, a creepage distance extension portion 190c may include an inner extension section 191c extending in the circumferential direction from the end of the shoe 1606 and an outer extension section 191c extending outwardly from the inner extension section 191c.

The outer extension section 192c may include a radial extension section 193c extending in the radial direction from the inner extension section 191c and a circumferential extension section 194c extending in the circumferential direction from the radial extension section 193c. In one embodiment, the inner extension section 191c and the outer extension section 192c may be configured to include curved sections 1913c, 193c, and 1941c each having a curved shape.

The inner extension section 191c may include a first section 1911c extending in a circumferential direction from the shoe 1606, a second section 1912c bent from the first section 1911c and extending in a radial direction, and a third section 1913c extending from the second section 1912c in a curved shape along the circumferential direction. Here, the third section 1913c may be implemented in a circular arc (a semicircle) shape having a radius of a preset size.

The outer extension section 192c may include a radial extension section 193c extending in the radial direction from the inner extension section 191c and a circumferential extension section 194c extending in the circumferential direction from the radial extension section 193c. The radial extension section 193c may extend in a curved shape from the third section 1913c of the inner extension section 191c, for example. The radial extension section 193c may be implemented in an arc shape having a radius of a preset size.

The circumferential extension section 194c may include a first section 1941c extending in a curved shape from the radial extension section 193c, a second section 1942c extending in the radial direction from the first section 1941c, and a third section 1943c bent from the second section 1942c and extending in the circumferential direction. The first section 1941c may, for example, be implemented in a circular arc (a semicircle) shape having a radius of a preset size.

According to this configuration, the creepage distance may be further extended by the third section 1913c of the inner extension section 191c having a longer length than a straight line and the first section 1941c of the radial extension section 193c and the outer extension section 192c.

Figure 22:
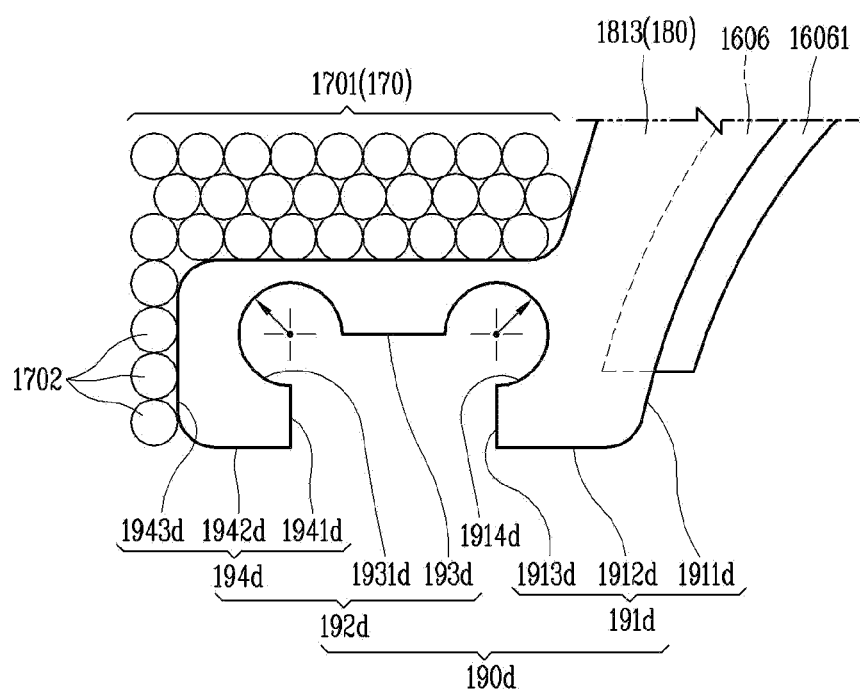
FIG. 22 is a modified example of the creepage distance extension portion of FIG. 18.

FIG. 22 is a modified example of the creepage distance extension portion 190 of FIG. 18. As shown in FIG. 22, a creepage distance extension portion 190d may include an inner extension section 191d extending in the circumferential direction from the end of the shoe 1606 and an outer extension section 192d extending outwardly from the inner extension section 191d.

The outer extension section 192d may include a radial extension section 193d extending in the radial direction from the inner extension section 191d and a circumferential extension section 194d extending in the circumferential direction from the radial extension section 193d. In one embodiment, the inner extension section 191d and the outer extension section 192d may be configured to have curved sections 1914d and 1931d each having a curved shape.

The inner extension section 191d may include a first section 1911d extending in the circumferential direction from the shoe 1606, a second section 1912d bent from the first section 1911d and extending in the radial direction, and a third section 1913d extending in the circumferential direction from the second section 1912d. The outer extension section 192d may include a radial extension section 193d extending in the radial direction from the inner extension section 191d and a circumferential extension section 194d extending in the circumferential direction from the radial extension section 193d.

In one embodiment, the curved sections 1914d and 1931d may include a first curved section 1914d configured at a boundary between the inner extension section 191d and the outer extension section 192d. The first curved section 1914d may be implemented, for example, in an arc shape having a radius of a preset size.

The first curved section 1914d may be implemented, for example, in an arc shape corresponding to ¾ of a circle having a radius equal to a length of the third section 1913d of the inner extension section 191d. The radial extension section 193d may be configured to extend in a radial direction from the first curved section 1914d.

The curved sections 1914d and 1931d may include a second curved section 1931d extending in a curved shape from the radial extension section 193d. The second curved section 1931d may be implemented, for example, in an arc shape having a radius of a preset size.

The second curved section 1931*d* may be implemented, for example, with a radius equal to the radius of the first curved section 1914*d*. The second curved section 1931*d* may be implemented in an arc shape having a size corresponding to ¾ of a circle having the same radius as that of the first curved section 1914*d*.

The circumferential extension section 194*d* may include a first section 1941*d* extending in the circumferential direction from the second curved section 1931*d*, a second section 1942*d* bent from the first section 1941*d* and extending in the radial direction, and a third section 1943*d* bent from the section 1942*d* and extending in the circumferential direction.

According to this configuration, the creepage distance extension portion 190*d* of the example depicted in FIG. 22 may be configured to include the first curved section 1914*d* and the second curved section 1931*d* having a longer length compared to a straight line, so that the creepage distance between the stator coil 170 and the stator core 160 may be further extended.

Figure 23:
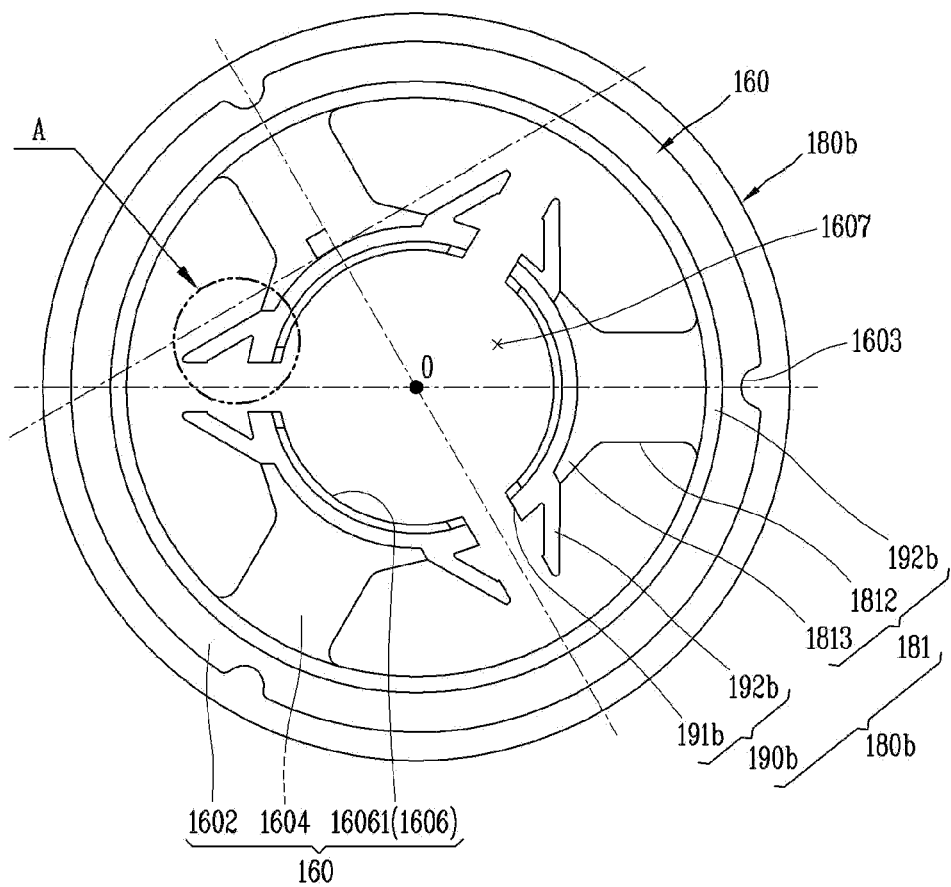
FIG. 23 is a plan view of a stator core before winding of a stator coil of a motor assembly according to another embodiment of the present disclosure.
Figure 24:
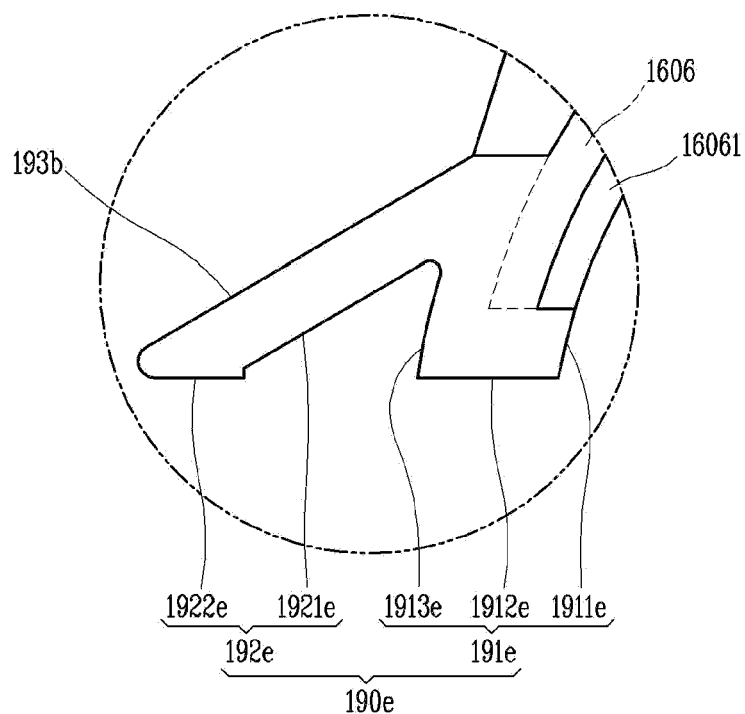
FIG. 24 is an enlarged view of the creepage distance extension portion of FIG. 23.

FIG. 23 is a plan view of a stator core before winding of a stator coil 170 of a motor assembly according to another embodiment of the present disclosure, and FIG. 24 is an enlarged view of the creepage distance extension portion of FIG. 23. A motor assembly of the present embodiment includes a stator 150 and a rotor 210, as described above.

The stator 150 may include a stator core 160, a stator coil 170 wound around the stator core 160, and an insulator 180*b* insulating the stator core 160 and the stator coil 170. The stator core 160 may include a yoke 1602, a plurality of teeth 1604 protruding from the yoke 1602, and a shoe 1606 extending to both sides in the circumferential direction at the ends of the plurality of teeth 1604. As shown in FIG. 23, the insulator 180*b* may be manufactured by injection-molding by inserting the stator core 160.

The insulator 180*b* may include an insulator body 181 surrounding and insulating an inner surface of the yoke 1602 and a circumferential surface of the teeth 1604 and surrounding and insulating an outer surface of the shoe 1606 such that an inner end 16061 of the shoe 1606 is exposed to the outside and a creepage distance extension portion 190*e* extending a creepage distance between the stator coil 170 and the inner end 16061 of the shoe 1606.

The insulator body 181 may include, for example, a yoke insulating portion 1811 insulating the inner surface of the yoke 1602, a teeth insulating portion 1812 insulating a circumferential surface (an upper surface, a lower surface, and both side surfaces) of the tooth 1604, and a shoe insulating portion 1813 insulating the shoe 1606 so that the inner end 16061 of the shoe 1606 is exposed to the outside. In one embodiment, the shoe insulating portion 1813 of the insulator 180*b* may be configured to have the same inner diameter as an inner diameter of the shoe 1606.

The yoke insulating portion 1811 may be disposed on the inner surface of the yoke 1602 and may be configured to protrude to both sides (an upper side and a lower side) of the stator core 160 in the axial direction. The yoke insulating portion 1811 may have a protrusion 18112 in a region disposed below the stator core 160 to have an outer diameter greater than an outer diameter of the stator core 160 along the radial direction for the formation of the aforementioned connection pin coupling portion 18113. In one embodiment, the aforementioned cutout portion 18114 may not be provided in the protrusion 18112.

In one embodiment, the creepage distance extension portion 190*e* may include an inner extension section 191*e* extending in the circumferential direction from the end of the shoe 1606 along the circumferential direction and an outer extension section 192*e* extending outwardly from the inner extension section 191*e*. As shown in FIG. 24, the inner extension section 191*e* may include a first section 1911*e* extending in the circumferential direction from the shoe 1606, a second section 1912*e* bent from the first section 1911*e* and extending in the radial direction, and a third section 1913*e* bent from the second section 1912*e* and extending in the circumferential direction.

The outer extension section 192*e* may be configured to extend obliquely to the outside from the inner extension section 191*e*. The outer extension section 192*e* may include a first section 1921*e* obliquely extending outwardly from the third section 1913*e* of the inner extension section 191*e* and a second section 1922*e* bent from the first section 1921*e* and extending in the radial direction. In one embodiment, a round portion may be provided at a boundary region between the third section 191*e*3 of the inner extension section 191*e* and the first section 192*e*1 of the outer extension section 192*e*.

Figure 25:
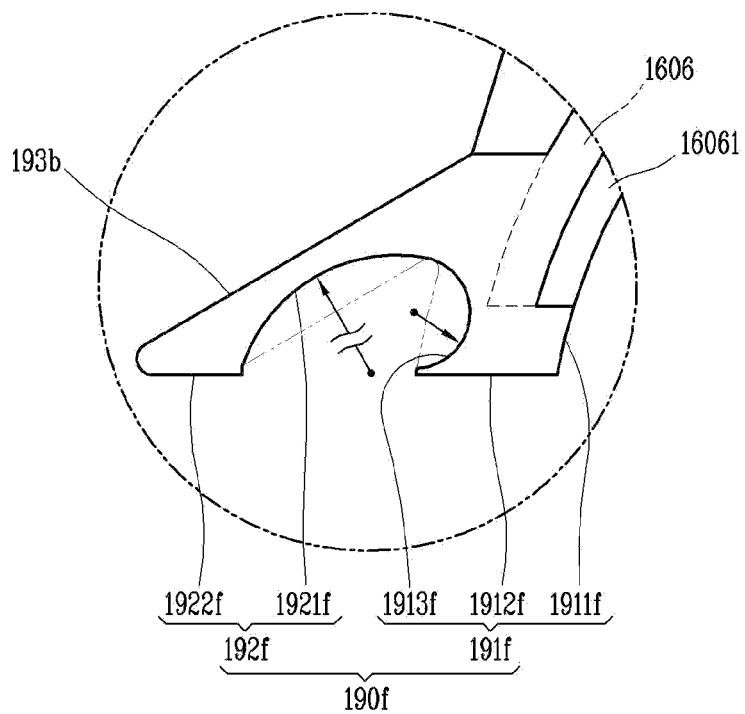
FIG. 25 is a modified example of the creepage distance extension portion of FIG. 24.

FIG. 25 is a modified example of the creepage distance extension portion 190*e* of FIG. 24. As shown in FIG. 25, in one embodiment, the creepage distance extension portion 190*f* may include an inner extension section 191*f* extending in the circumferential direction from the shoe 1606 and an outer extension section 192*f* extending outwardly from the inner extension section 191*f*.

In one embodiment, the outer extension section 192*f* may include, for example, an outer surface 193*b* extending in a vertical direction with respect to a connection line connecting the center of the tooth 1604 and the center of the stator core 160. In one embodiment, the creepage distance extension portion 190*f* may be configured to include curved sections 191*f*3 and 192*f*1 extending in a curved shape so that the creepage distance may be extended.

The inner extension section 191*f* may include a first section 1911*f* extending in the circumferential direction from the shoe 1606, a second section 1912*f* bent from the first section 1911*f* and extending in the radial direction, and a third section 1913*f* extending from the second section 1912*f* in a curved shape along the circumferential direction.

In one embodiment, the third section 1913*f* of the inner extension section 191*f* may be implemented, for example, in an arc shape having a radius of a preset size. The outer extension section 192*f* may include a first section 1921*f* extending from the inner extension section 191*f* (the third section 1913*f*) in a curved shape and a second section 1922*f* bent from the first section 1921*f* and extending in the radial direction. The first section 192*f*1 may be implemented, for example, in an arc shape having a radius of a preset size.

According to this configuration, the creepage distance between the stator coil 170 wound around the teeth 1604 and the stator core 160 may be further extended by the third section 1913*f* of the inner extension section 191*f* provided in a curved shape and the first section 1921*f* of the outer extension section 192*f*.

Therefore, the present disclosure describes a motor assembly in which a creepage distance between a stator coil and a stator core may be increased in both a circumferential direction and a radial direction, without increasing a size of a stator in the radial direction. Furthermore, the present disclosure also describes a motor assembly in which an interval for winding a stator coil and a creepage distance of the stator coil are secured. Therefore, the present disclosure also describes a motor assembly in which an internal space of a slot may be increased by reducing a thickness of an insulator. The present disclosure also describes a motor assembly in which the same creepage distance may be maintained and an interval for winding a stator coil may be increased.

In order to achieve these and other aspects, as embodied and broadly described herein, there is provided a motor assembly in which an insulator for insulating a stator core and a stator coil includes a creepage distance extension portion configured to extend a creepage distance in circumferential and outward directions of the stator core. More specifically, the insulator may include an insulator body that wraps and insulates an inner surface of a yoke of the stator core, a circumferential surface of teeth, and an outer surface of a shoe and a creepage distance extension portion extending a creepage distance between the stator coil and an inner end of the shoe, wherein the creepage distance extension portion includes an inner extension section extending in a circumferential direction of the stator core and an outer extension section extending outwardly from the inner extension section, accordingly increasing the creepage distance without increasing a radial size of the stator core.

In an embodiment of the present disclosure, the motor assembly may include a stator and a rotor rotatably disposed with respect to the stator, and the stator may have an outer diameter of 20 mm or less. In an embodiment of the present disclosure, the rotor may be configured to include a rotating shaft and a permanent magnet coupled to the rotating shaft.

In an embodiment of the present disclosure, an impeller may be provided on the rotating shaft, an outer housing may be provided on an outer side of the impeller, and an inner housing may be concentrically provided on an inner side of the outer housing. The motor assembly may be implemented as a miniature motor assembly in which the outer housing of the present embodiment may have an outer diameter of 30 mm or less and the stator may have an outer diameter of 20 mm or less.

An outer surface of the inner housing may be configured to be spaced apart from an inner surface of the outer housing, and a plurality of vanes having one end connected to the inner surface of the outer housing may be provided on the outer surface of the inner housing. The stator may include a stator core, a stator coil wound around the stator core, and an insulator insulating the stator core and the stator coil. The insulator may be formed of a synthetic resin member.

The stator core may include a circular yoke, a plurality of teeth protruding radially from an inner surface of the yoke, and a shoe extending from each end of the plurality of teeth to both sides in a circumferential direction. In an embodiment of the present disclosure, the plurality of teeth may be implemented as three teeth.

The stator coil may include three-phase coils respectively wound on the three teeth. The three-phase coils may be configured to be connected to phases (U-phase, V-phase, and W-phase) of a three-phase AC power source, respectively.

The motor assembly may include a printed circuit board (PCB) connected to the three-phase coils. The PCB may be configured such that three-phase AC power is applied. The stator coil may be connected to a three-phase power supply unit of the PCB.

A motor assembly according to an embodiment of the present disclosure may include: a stator including a stator core, a stator coil wound around the stator core, and an insulator insulating the stator core and the stator coil; and a rotor rotatably disposed with respect to the stator, wherein the stator core includes: a yoke; a plurality of teeth protruding from the yoke along a radial direction; and a shoe extending from each end of the plurality of teeth to both sides along a circumferential direction, wherein the insulator includes an insulator body surrounding and insulating an inner surface of the yoke and a circumferential surface of the teeth and surrounding and insulating an outer surface of the shoe so that an inner end of the shoe is exposed to the outside; and a creepage distance extension portion extending a creepage distance between the stator coil and the inner end of the shoe, wherein the creepage distance extension portion includes an inner extension section extending in the circumferential direction from an end of the shoe along the circumferential direction; and an outer extension section extending outwardly from the inner extension section. Accordingly, the creepage distance between the stator coil and the stator core may be effectively increased, while an appearance of the miniature motor assembly is maintained, without increasing an outer diameter of the stator.

In an embodiment of the present disclosure, the outer extension section may include a radial extension section extending in a radial direction from the inner extension section; and a circumferential extension section extending in a circumferential direction from the radial extension section. In this example, the radial extension section may protrude from a point moved by a preset distance from the end of the inner extension section toward the tooth along the circumferential direction. Accordingly, the creepage distance may be increased, without increasing the radial length of the outer extension section.

In an embodiment of the present disclosure, the insulator body may include a yoke insulating portion insulating an inner surface of the yoke; a teeth insulating portion insulating a circumferential surface of the teeth; and a shoe insulating portion insulating an outer surface of the shoe. The yoke insulating portion and the shoe insulating portion may each include a guide extending to both sides compared to the teeth insulating portion along an axial direction. Accordingly, a radial movement of the stator coil wound around the teeth insulating portion may be suppressed.

In an embodiment of the present disclosure, the insulator may be injection-molded by inserting the stator core. Accordingly, compared to a case of assembling the insulator to the stator core, a thickness may be reduced and a reduction of a winding space of the stator coil due to an increase in the thickness may be suppressed.

In an embodiment of the present disclosure, the inner extension section may have an inner diameter that is extended compared to an inner diameter of the shoe so that the end of the shoe protrudes by a preset length. An inner end of the shoe may be configured to protrude inwardly from the inner extension section along a radial direction. In this example, the end of the shoe protruding inwardly along the radial direction compared to the inner extension section may be used to support the stator during insert injection molding of the stator. Accordingly, the stator may be supported stably.

In an embodiment of the present disclosure, the yoke insulating portion may include a protrusion having an outer diameter that is extended compared to an outer diameter of the yoke, and the protrusion may include a cutout portion cut to have a minimum outer diameter smaller than the outer diameter of the yoke. In this example, each portion of the stator core radially protruding from the yoke insulating portion due to the formation of the cutout portion may be used to support the stator during insert injection molding of the stator. Accordingly, the stator may be supported stably.

In an embodiment of the present disclosure, the cutout portion may be implemented as a plurality of cutout portions spaced apart along the circumferential direction, and any one of the plurality of cutout portions may have a shape different from the rest of the plurality of cutout portions. Accordingly, the plurality of cutout portions may be easily identified, so that the winding of the stator coil may be facilitated.

In an embodiment of the present disclosure, a guide surface configured to have an axial length gradually decreased outwardly along a radial direction may be provided at both ends of the creepage distance extension portion along the axial direction. Accordingly, winding of a wire of the stator coil at the end of the creepage distance extension portion along the axial direction when the stator coil is wound may be suppressed.

In an embodiment of the present disclosure, the guide surface may have an outwardly convex arc cross-section. Accordingly, when the stator coil is wound, the wire of the stator coil may be smoothly moved to one side of the creepage distance extension portion along the guide surface to be wound.

In an embodiment of the invention, the guide surface may have an outwardly inclined linear cross-section. Accordingly, when the stator coil is wound, the wire of the stator coil may be smoothly moved to one side of the creepage distance extension portion along the guide surface to be wound.

In an embodiment of the present disclosure, the insulator may include a connection pin coupling portion to which the other end of a connection pin having one end connected to a PCB is coupled. Accordingly, after injection molding of the stator, the connection pin may be easily connected.

The connection pin may be implemented as an electrical conductor. In this example, an end of the wire of the stator coil may be electrically connected to the connection pin.

After the wire of the stator coil is wound around the connection pin several times, the wire of the stator coil may be electrically connected. The insulator may have a guide protrusion guiding the wire. Accordingly, the wire of the stator coil may be stably supported, so that the occurrence of disconnection of the wire may be suppressed.

In an embodiment of the present disclosure, the outer extension section may be configured to have an outer surface extending in a direction perpendicular to the radial direction from the shoe insulating portion. Accordingly, since the outer surface is parallel to a stacking direction of the stator coil (wire) wound around the teeth, the stator coils may be stacked stably.

In an embodiment of the present disclosure, the end of the inner extension section and the end of the outer extension section may be arranged on the same line. Accordingly, an interval between the inner extension sections and an interval between the outer extension sections may be the same.

In an embodiment of the present disclosure, the inner extension section or the outer extension section may be configured with a curved section. Accordingly, the creepage distance between the stator coil and the stator core may be further increased.

In an embodiment of the present disclosure, a boundary region of the inner extension section and the outer extension section may have a curved section having a curved shape. Accordingly, the creepage distance between the stator coil and the stator core may be further increased.

In an embodiment of the present disclosure, a curved section having a curved shape may be provided in a boundary region between the inner extension section and the outer extension section. Accordingly, the creepage distance between the stator coil and the stator core may be further increased.

In an embodiment of the present disclosure, the impeller may be disposed on one side of the inner housing along the axial direction on an inner side of the outer housing. When the impeller rotates, external air of the outer housing may move along an air flow path between the inner housing and the outer housing via the impeller.

In an embodiment of the present disclosure, the stator may be configured to have one end inserted into the inner housing at a preset depth along the axial direction. Accordingly, the air moved when the impeller rotates may be moved along an outer surface of the stator.

In an embodiment of the present disclosure, a bearing assembly rotatably supporting the rotating shaft may be provided inside the inner housing. The rotor may be provided on one side of the bearing assembly along the axial direction and the impeller may be provided on the other side. The bearing assembly may be disposed between the impeller and the rotor.

The bearing assembly may be disposed inside the inner housing. A bearing assembly accommodating portion in which the bearing assembly is accommodated may be provided inside the inner housing. A stator accommodating portion in which the stator is accommodated may be provided inside the inner housing.

In an embodiment of the present disclosure, the inner housing may have a through portion penetrated along the axial direction. Accordingly, when the impeller rotates, air may be moved through the through portion.

The through portion may be implemented in plurality along the circumferential direction of the inner housing. Accordingly, more air may be moved through the inner housing.

In an embodiment of the present disclosure, the through portion may be provided on an outer side of the bearing assembly. Accordingly, cooling of the bearing assembly may be promoted by the air moved through the through portion.

In an embodiment of the present disclosure, the bearing assembly may include an outer ring, an inner ring concentrically disposed on an inner side of the outer ring, and a plurality of balls disposed between the outer ring and the inner ring. The bearing assembly may include a first bearing and a second bearing spaced apart from each other along the axial direction. Accordingly, the occurrence of lateral displacement of the rotating shaft may be suppressed.

A spacer may be provided between the first bearing and the second bearing. Accordingly, a preset interval between the first bearing and the second bearing may be maintained stably.

As described above, according to an embodiment of the present disclosure, the insulator includes a creepage distance extension portion extending a creepage distance between the stator coil and the stator core, wherein the creepage distance extension portion includes the inner extension section extending from both ends of the shoe in the circumferential direction and the outer extension section extending outwardly from the inner extension section, accordingly increasing a creepage distance, without increasing a radial size of the stator core.

In addition, since the outer extension section includes a radial extension section extending in a radial direction from the inner extension section and a circumferential extension section extending in the circumferential direction from the radial extension section, an increase in the creepage distance may be increased, while an increase in a radial size is suppressed.

In addition, since the insulator is injection-molded by inserting the stator core, a thickness of the insulator may be reduced to increase a winding space of the stator coil. In addition, since the inner extension section has an inner diameter that is extended compared to the inner diameter of the shoe, the support of the stator core may be facilitated during insert injection molding.

In addition, since the yoke insulating portion has a plurality of cutout portions having a minimum outer diameter smaller than the outer diameter of the yoke, the support of the stator core may be facilitated during insert injection molding. In addition, since any one of the plurality of cutout portions has a different shape, identification may be facilitated and the winding of the stator coil may be facilitated.

In addition, since the creepage distance extension portion is provided to have a guide surface such that an axial length is reduced outwardly along the radial direction at both ends along the axial direction, the winding of the stator coil may be facilitated. In addition, since the insulator has a guide protrusion guiding the wire of the stator coil, the wire of the stator coil may be stably supported to suppress the occurrence of disconnection of the wire.

In addition, since the outer extension section extends in a direction perpendicular to the radial direction from the shoe insulating portion, the winding of the stator coil around the teeth (teeth insulating portion) may be facilitated. In addition, since the outer extension section or the inner extension section have the curved section, the creepage distance may be effectively increased.

In addition, since the outer extension section is configured to include an inclined section inclined with respect to the radial direction, the creepage distance may be effectively increased. In addition, since one end of the stator is inserted into one end of the inner housing by a preset depth, the axial length of the motor assembly may be shortened and the concentricity of the inner housing and the stator may be effectively maintained.

In addition, since the impeller is provided on an outer side of the inner housing and a bearing assembly for rotatably supporting the rotating shaft of the rotor is provided inside the inner housing, rotation of the impeller and the rotor may be smooth.

So far, those specific implementations of the present disclosure have been illustrated and described. However, since the present disclosure may be embodied in various forms without departing from the essential characteristics, the implementations described above should not be limited by the specific contents for carrying out the invention.

In addition, even implementations not listed in the foregoing detailed description should be broadly construed within the scope of the technical idea defined in the appended claims. And, all changes and modifications included within the technical range of the claims and their equivalents should be embraced by the appended claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor assembly comprising:
   a stator including a stator core, a stator coil wound around the stator core, and an insulator insulating the stator core and the stator coil; and
   a rotor rotatably provided with respect to the stator,
   wherein the stator core includes:
      a yoke;
      a plurality of teeth protruding from the yoke along a radial direction; and
      shoes extending, respectively, from ends of the plurality of teeth, each of the shoes extending from a corresponding one of the plurality teeth to both sides along a circumferential direction,
   wherein the insulator includes:
      an insulator body surrounding and insulating an inner surface of the yoke and a circumferential surface of the teeth, and surrounding and insulating an outer surface of the shoe so that an inner end of the shoe is exposed; and
      an insulator extension configured to extend a creepage distance between the stator coil and the inner end of the shoe,
   wherein the insulator extension includes:
      an inner extension section extending in the circumferential direction from an end of one of the shoes along the circumferential direction; and
      an outer extension section extending outwardly from the inner extension section,
   wherein the inner extension section includes:
      a first section extending in the circumferential direction from the inner end of the shoe;
      a second section bent from the first section and extending in the radial direction; and
      a third section bent from the second section and extending in the circumferential direction, and
   wherein a guide surface is provided at both ends of the insulator extension along an axial direction, the guide surface having an axial length that is decreased outwardly along the radial direction.

2. The motor assembly of claim 1, wherein the outer extension section includes:
   a radial extension section extending in the radial direction from the inner extension section; and
   a circumferential extension section extending in the circumferential direction from the radial extension section.

3. The motor assembly of claim 1, wherein the insulator body includes:
   a yoke insulating portion insulating an inner surface of the yoke;
   a teeth insulating portion insulating a circumferential surface of the teeth; and
   a shoe insulating portion insulating an outer surface of the shoes,
   wherein the yoke insulating portion and the shoe insulating portion each include a guide extending to both sides compared to the teeth insulating portion along an axial direction.

4. The motor assembly of claim 3, wherein the insulator is injection-molded around the stator core.

5. The motor assembly of claim 4, wherein the inner extension section has an inner diameter that is extended compared to an inner diameter of the shoe so that the end of the shoe protrudes by a preset length.

6. The motor assembly of claim 4, wherein
   the yoke insulating portion includes a protrusion having an outer diameter that is extended compared to an outer diameter of the yoke, and
   the protrusion includes a plurality of cutout portions cut to have a minimum outer diameter smaller than the outer diameter of the yoke.

7. The motor assembly of claim 6, wherein a shape of one of the plurality of cutout portions is different from a shape of other ones of the plurality of cutout portions.

8. The motor assembly of claim 1, wherein the guide surface has an outwardly convex arc cross-section.

9. The motor assembly of claim 1, wherein the guide surface has an outwardly inclined linear cross-section.

10. The motor assembly of claim 1, wherein the insulator includes a connection pin coupling portion to which an end of a connection pin having another end connected to a printed circuit board (PCB) is coupled.

11. The motor assembly of claim 10, wherein
    an end of a wire of the stator coil is electrically connected to the connection pin, and
    the insulator includes a guide protrusion guiding the wire.

12. The motor assembly of claim 10, wherein
    the plurality of teeth are configured as three teeth,
    the stator coil includes three phase coils respectively wound on the plurality of teeth, and the three phase coils are connected to a three-phase power supply unit of the PCB.

13. The motor assembly of claim 1,
    wherein the insulator body includes:
       a yoke insulating portion insulating an inner surface of the yoke;
       a teeth insulating portion insulating a circumferential surface of the teeth; and
       a shoe insulating portion insulating an outer surface of the shoes, and
    wherein the outer extension section has an outer surface extending in a direction perpendicular to the radial direction from the shoe insulating portion.

14. The motor assembly of claim 13, wherein an end of the inner extension section and an end of the outer extension section are collinear.

15. The motor assembly of claim 1, wherein at least one of the inner extension section or the outer extension section includes a curved section.

16. The motor assembly of claim 1, wherein a boundary region of the inner extension section and the outer extension section is a curved section having a curved cross-sectional shape.

17. The motor assembly of claim 1, wherein:
    the rotor includes a rotating shaft and a magnet coupled to the rotating shaft,
    an impeller is coupled to the rotating shaft,
    an outer housing is provided outside the impeller,
    an inner housing is concentrically provided inside the outer housing, and
    the stator is inserted by a preset depth into one end of the inner housing along the axial direction.

18. The motor assembly of claim 17, wherein the inner housing includes a bearing assembly rotatably supporting the rotating shaft.

19. A motor assembly comprising:
    a stator including a stator core, a stator coil wound around the stator core, and an insulator insulating the stator core and the stator coil; and a rotor rotatably provided with respect to the stator,
wherein the insulator includes:
  an insulator body surrounding and insulating a shoe of the stator core; and
  an insulator extension configured to extend a creepage distance from the stator coil,
wherein the insulator extension includes:
  an inner extension section extending in the circumferential direction from the shoe of the stator core along a circumferential direction; and
  an outer extension section extending outwardly from the inner extension section,
wherein the outer extension section includes:
  a radial extension section extending in a radial direction from the inner extension section; and
  a circumferential extension section extending in the circumferential direction from the radial extension section,
wherein the inner extension section includes:
  a first section extending in the circumferential direction from the inner end of the shoe;
  a second section bent from the first section and extending in the radial direction; and
  a third section bent from the second section and extending in the circumferential direction, and
wherein a guide surface is provided at both ends of the insulator extension along an axial direction, the guide surface having an axial length that is decreased outwardly along the radial direction.

\* \* \* \* \*